US012266876B2

(12) United States Patent
Nakamura

(10) Patent No.: US 12,266,876 B2
(45) Date of Patent: Apr. 1, 2025

(54) CONNECTOR AND ASSEMBLY

(71) Applicant: Japan Aviation Electronics Industry, Limited, Tokyo (JP)

(72) Inventor: Keisuke Nakamura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 389 days.

(21) Appl. No.: 17/990,840

(22) Filed: Nov. 21, 2022

(65) Prior Publication Data

US 2023/0198180 A1 Jun. 22, 2023

(30) Foreign Application Priority Data

Dec. 20, 2021 (JP) ................................ 2021-206302

(51) Int. Cl.

*H01R 12/71* (2011.01)
*H01R 13/24* (2006.01)
*H01R 13/405* (2006.01)
*H01R 13/516* (2006.01)
*H01R 13/639* (2006.01)

(52) U.S. Cl.

CPC ....... *H01R 12/716* (2013.01); *H01R 13/2407* (2013.01); *H01R 13/405* (2013.01); *H01R 13/516* (2013.01); *H01R 13/639* (2013.01)

(58) Field of Classification Search

CPC ........................... H01R 12/716; H01R 12/712
See application file for complete search history.

(56) References Cited

U.S. PATENT DOCUMENTS 6,638,078 B2 * 10/2003 Hashiguchi ........ H01R 13/2435 439/74
9,077,102 B2 7/2015 Miyazaki
10,516,228 B2 12/2019 Takenaga et al.
(Continued)

FOREIGN PATENT DOCUMENTS

JP 2004103491 A 4/2004
JP 2008-034283 A 2/2008
(Continued)

OTHER PUBLICATIONS

Office Action issued in Korean Patent Application No. 10-2022-0162194 on May 27, 2024 (with English translation).
(Continued)

*Primary Examiner* — James Harvey
(74) *Attorney, Agent, or Firm* — Collard & Roe, P.C.

(57) ABSTRACT

First terminals and second terminals are alternately arranged in the pitch direction. The first terminal has a first mount portion, and the second terminal has a second mount portion. Each of the supporting portions is resiliently deformable at least in part and extends from the first contact portion to support the second contact portion. The second contact portion of each of the first terminals and the second terminals faces the first contact portion in a width direction and is movable in the width direction due to resilient deformation of the supporting portion. In the second terminal, the extension portion extends from the second contact portion, and the second mount portion is formed in a part of the extension portion. The second mount portion is located apart from the first mount portion in the width direction.

12 Claims, 23 Drawing Sheets

(56) References Cited

U.S. PATENT DOCUMENTS

| | | | | |
|---|---|---|---|---|
| 2006/0276075 | A1* | 12/2006 | Iida ........................ | H01R 12/79 439/492 |
| 2008/0026609 | A1 | 1/2008 | Kuwana et al. | |
| 2016/0268715 | A1 | 9/2016 | Kodaira | |
| 2023/0198180 | A1* | 6/2023 | Nakamura ........... | H01R 13/639 439/74 |

FOREIGN PATENT DOCUMENTS

| | | | |
|---|---|---|---|
| JP | 2012-164528 | A | 8/2012 |
| JP | 2016-152083 | A | 8/2016 |
| JP | 2017-033698 | A | 2/2017 |
| JP | 2017-073355 | A | 4/2017 |
| JP | 6241712 | B2 | 12/2017 |
| JP | 2019-046670 | A | 3/2019 |
| JP | 2021-068608 | A | 4/2021 |
| KR | 20190026564 | A | 3/2019 |
| KR | 10-2021-0117930 | A | 9/2021 |

OTHER PUBLICATIONS

Korean Office Action dated Aug. 29, 2024 in Korean Application No. 10-2022-0162238, with English translation.

* cited by examiner

CONNECTOR AND ASSEMBLY

CROSS REFERENCE TO RELATED APPLICATIONS

This application is based on and claims priority under 35 U.S.C. § 119 to Japanese Patent Application No. JP2021-206302 filed Dec. 20, 2021, the contents of which are incorporated herein in their entirety by reference.

BACKGROUND OF THE INVENTION

This invention relates to a connector and an assembly, in particular, to a connector provided with first terminals and second terminals which are alternately arranged in a pitch direction, and to an assembly provided with the connector.

JP 2019-46670 A (Patent Document 1) discloses a connector provided with a plurality of terminals arranged in a pitch direction and a mating connector mateable with the connector.

Referring to FIG. 41, a connector 90 disclosed in Patent Document 1 is provided with a plurality of terminals 92 and a housing 94 which holds the terminals 92. The terminals 92 are held by the housing 94 to form two terminal rows. In each of the terminal rows, the terminals 92 are arranged in a pitch direction or an X-direction. The two terminal rows are arranged in a lateral direction or a Y-direction perpendicular to the pitch direction.

As shown in FIG. 42, each of the terminals 92 of the connector 90 is provided with a mount portion 921, a held portion 923, a supporting portion 925, a first contact portion 927 and a second contact portion 929. When the connector 90 is mounted on a substrate (not shown), the mount portion 921 is fixed to the substrate. The held portion 923 is held by the housing 94. The supporting portion 925 extends from the first contact portion 927 and supports the second contact portion 929.

As understood from FIG. 41, in each of the terminal rows, the terminals 92 are oriented in the same direction. In detail, in each of the terminal rows, the terminals 92 are arranged so that the mount portions 921 of them are oriented outward in a width direction or a Y-direction. When viewed along the pitch direction or the X-direction, the terminals 92 of each of the terminal rows are identical with one another.

As understood from FIG. 41, a mating connector 100 is provided with mating terminals 110 which correspond to the terminals 92 of the connector 90, respectively, and a mating housing 120 which holds the mating terminals 110. The mating terminals 110 are held by the mating housing 120 to form two mating terminal rows. In each of the mating terminal rows, the mating terminals 110 are arranged in the pitch direction. The two mating terminal rows are arranged in the width direction perpendicular to the pitch direction.

As shown in FIG. 41, each of the mating terminals 110 is provided with a mating mount portion 111, a mating held portion 113 and a U-shaped portion 115. When the mating connector 100 is mounted on a mating substrate (not shown), the mating mount portion 111 is fixed to the mating substrate. The mating held portion 113 is held by the mating housing 120. When the connector 90 and the mating connector 100 are mated with each other, the U-shaped portion 115 is inserted into between the first contact portion 927 and the second contact portion 929 of the terminal 92 and is electrically connected to the first contact portion 927 and the second contact portion 929.

As understood from FIG. 41, in each of the mating terminal rows, the mating terminals 110 are arranged so that the mating mount portions 111 of them are oriented outward in the width direction. In other words, when viewed along the pitch direction, the mating terminals 110 of each of the mating terminal rows are identical with one another.

In the connector 90 disclosed in Patent Document 1, a shortest distance between two of the terminals 92 which are adjacent to each other in the pitch direction depends on an arrangement of pads which are formed on the substrate to correspond to the mount portions 921 of the terminals 92, respectively. Here, two of the pads which are adjacent to each other in the pitch direction are spaced so that they are prevented from electrically connecting each other. Accordingly, the connector 90 disclosed in Patent Document 1 has a problem that it is difficult to reduce a distance between the terminals 92 adjacent to each other in the pitch direction.

SUMMARY OF THE INVENTION

It is therefore an object of the present invention to provide a connector which can reduce a distance between terminals adjacent to each other in a pitch direction. In addition, it is another object of the invention to provide an assembly provided with such a connector.

One aspect of the present invention provides a connector which comprises a plurality of terminals and a housing which holds the terminals. The terminals comprise first terminals and second terminals. The first terminals and the second terminals are alternately arranged in a pitch direction. Each of the first terminals has a first mount portion, a held portion, a first contact portion, a second contact portion and a supporting portion. Each of the second terminals has a held portion, a first contact portion, a second contact portion, a supporting portion, an extension portion and a second mount portion. In the first terminal, the held portion is located between the first mount portion and the first contact portion. For each of the first terminal and the second terminal, the held portion is held by the housing. In each of the first terminal and the second terminal, the supporting portion is resiliently deformable at least in part and extends from the first contact portion to support the second contact portion. In each of the first terminal and the second terminal, the second contact portion faces the first contact portion in a width direction perpendicular to the pitch direction and is movable in the width direction by using resilient deformation of the supporting portion. In the second terminal, the extension portion extends from the second contact portion. In the second terminal, the second mount portion is formed in a part of the extension portion. The second mount portion is located apart from the first mount portion in the width direction.

Another aspect of the present invention provides an assembly which comprises the above-mentioned connector and a mating connector which is mateable with the connector. The mating connector comprises a plurality of mating terminals and a mating housing which holds the mating terminals. The mating terminals comprise first mating terminals corresponding to the first terminals and second mating terminals corresponding to the second terminals. The first mating terminals and the second mating terminals are alternately arranged in the pitch direction. Each of the first mating terminals has a first mating mount portion, a first mating contact portion and a second mating contact portion. In the first mating terminal, the first mating contact portion is located between the first mating mount portion and the second mating contact portion. Each of the second mating terminals has a first mating contact portion, a second mating contact portion and a second mating mount portion. In the second mating terminal, the second mating contact portion is located between the first mating contact portion and the second mating mount portion. When the connector and the mating connector are mated with each other, the first mating contact portion and the second mating contact portion of the first mating terminal are brought into contact with the first contact portion and the second contact portion of the first terminal corresponding to the first mating terminal, respectively. When the connector and the mating connector are mated with each other, the first mating contact portion and the second mating contact portion of the second mating terminal are brought into contact with the first contact portion and the second contact portion of the second terminal corresponding to the second mating terminal, respectively. The first mating mount portion and the second mating mount portion are apart from each other in the width direction.

In the connector of the aspect of the invention, the first terminals and the second terminals are alternately arranged in the pitch direction. The first terminal has the first mount portion, and the second terminal has the second mount portion. In the width direction, the second mount portion is located apart from the first mount portion. When the connector is mounted on the substrate, the first terminal is fixed to the substrate by use of the first mount portion while the second terminal is fixed to the substrate by use of the second mount portion. With this structure, restriction from the substrate on which the connector is mounted can be eased, and a distance between the two terminals adjacent to each other in the pitch direction can be reduced.

Moreover, in the connector of the aspect of the invention, a positional relationship among the held portion, the first contact point and the second contact point are common to the terminals adjacent to each other in the pitch direction. Accordingly, the connector has a smaller insertion force for mating with the mating connector in comparison with a case where the positional relationship is inverted between the terminals adjacent to each other. Therefore, restriction derived from the insertion force is eased when the number of the terminals of the connector is increased. In addition, abrasion of the terminal can be suppressed, so that high connection reliability can be obtained.

An appreciation of the objectives of the present invention and a more complete understanding of its structure may be had by studying the following description of the preferred embodiment and by referring to the accompanying drawings.

Figure 1:
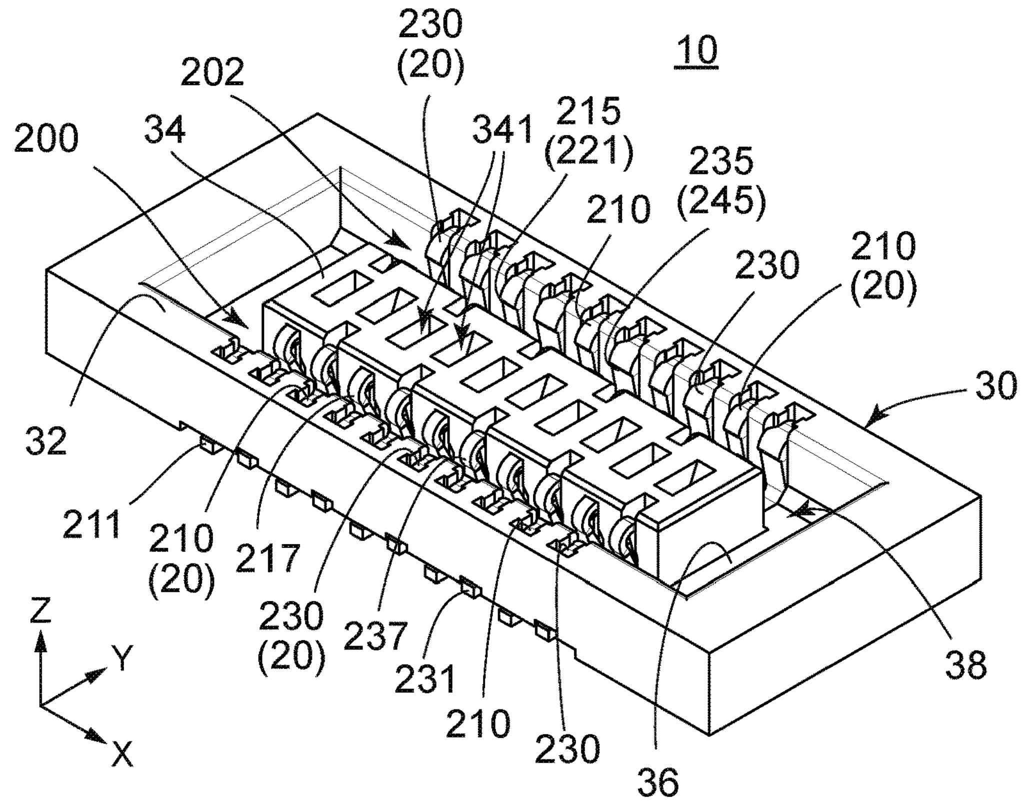
FIG. 1 is a top, perspective view showing a connector according to a first embodiment of the present invention.
Figure 2:
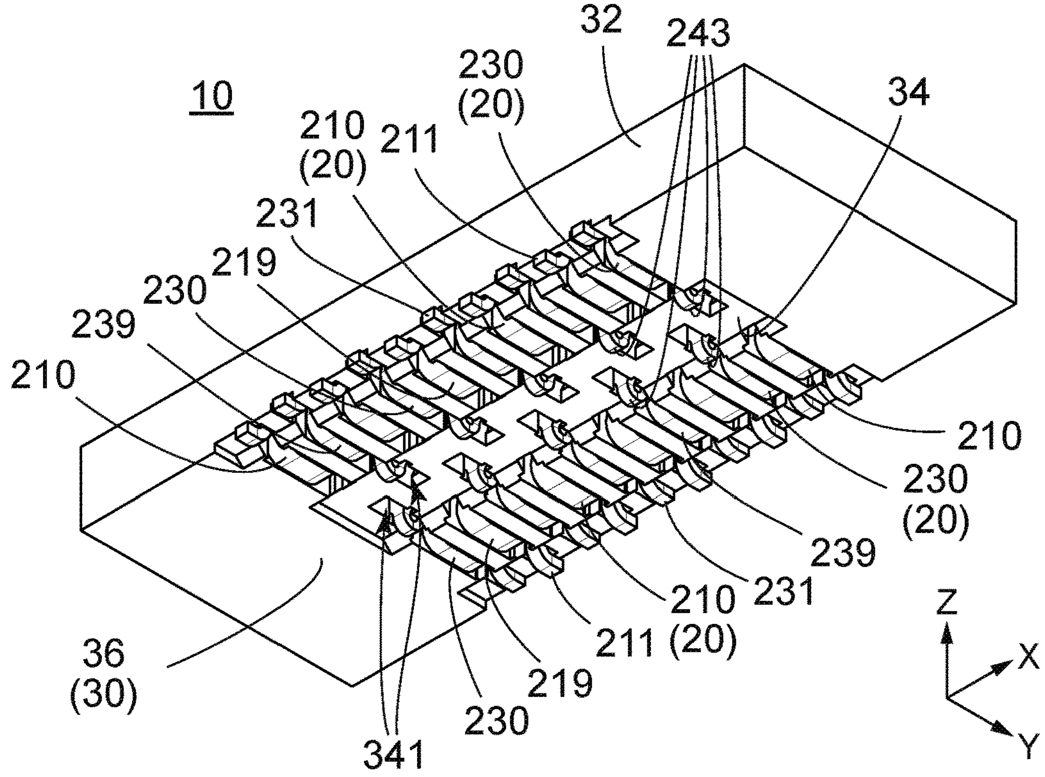
FIG. 2 is a bottom, perspective view showing the connector of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Referring to FIGS. 1 to 4, a connector 10 according to a first embodiment of the present invention is provided with a plurality of terminals 20 and a housing 30 which holds the terminals 20. In the present embodiment, each of the terminals 20 is formed of a sheet metal, and the housing 30 is made of insulating resin.

Figure 5:
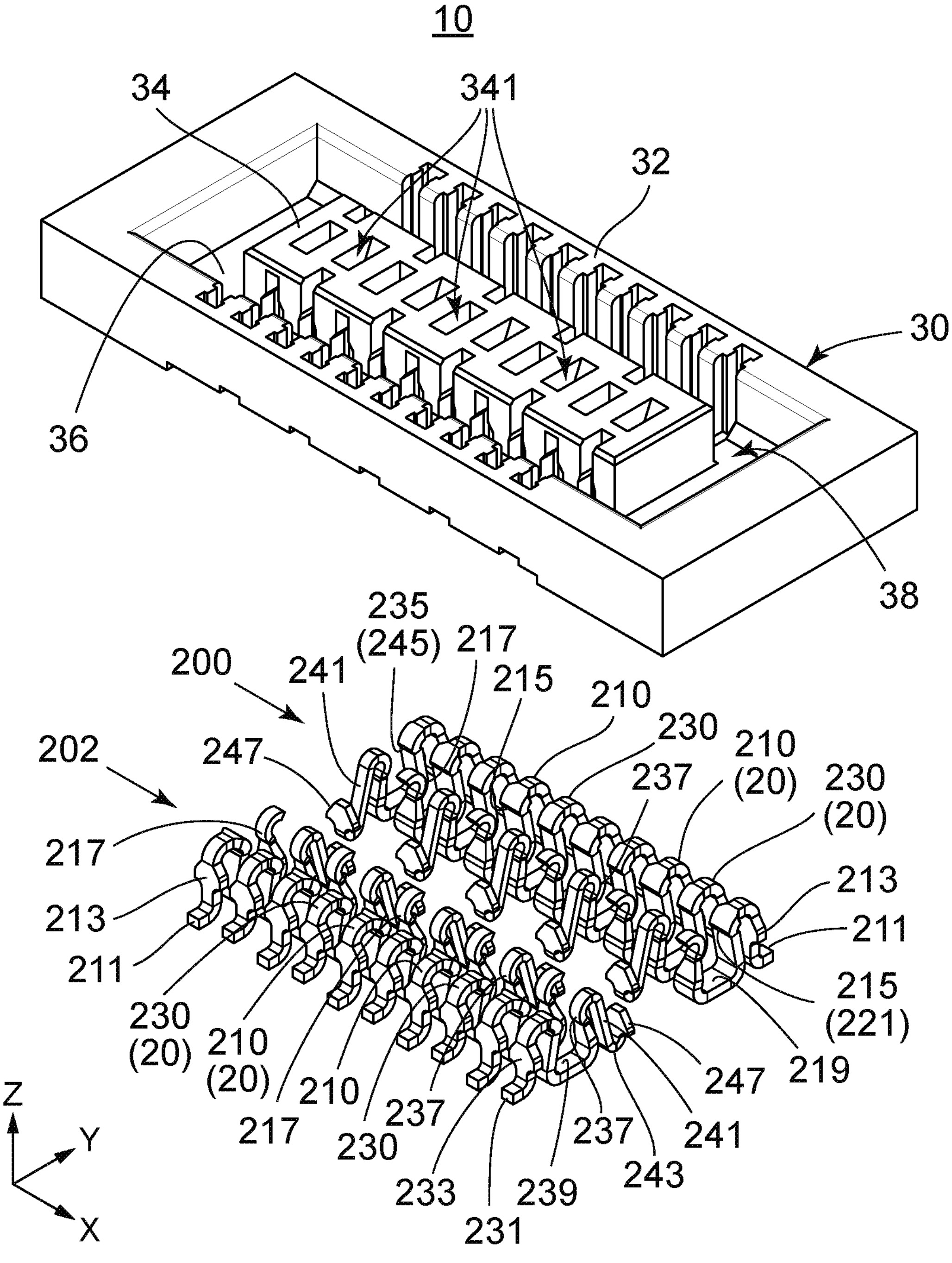
FIG. 5 is an exploded, top, perspective view showing the connector of FIG. 1.
Figure 6:
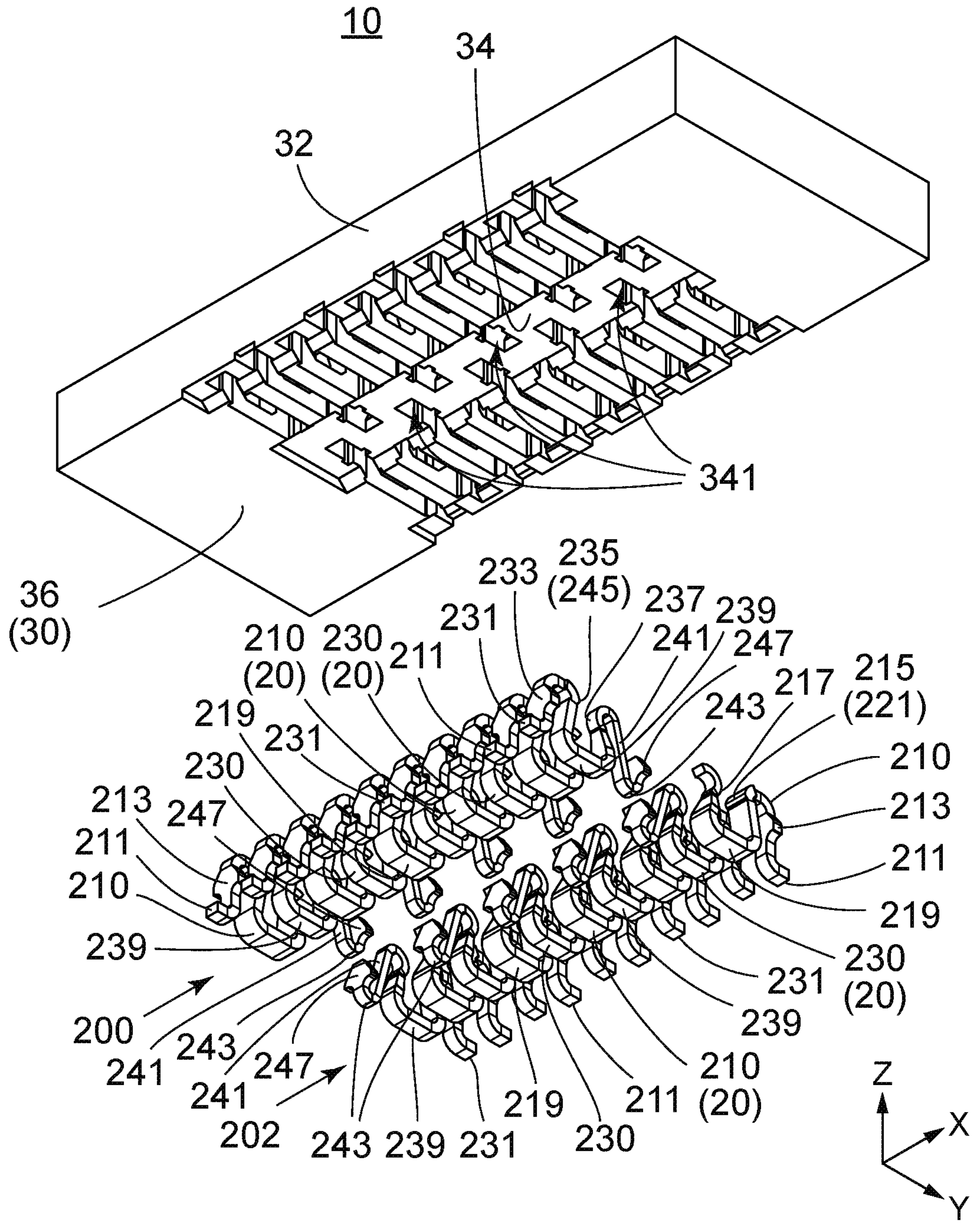
FIG. 6 is an exploded, bottom, perspective view showing the connector of FIG. 1.

As understood from FIGS. 5 and 6, in the present embodiment, the terminals 20 are arranged in two rows. In other words, the connector 10 is provided with two terminal rows 200 and 202, and each of the terminal rows 200 and 202 has some of terminals 20. However, the present invention is not limited thereto. The connector 10 may have only one terminal row. In a case where the number of the terminal row is one, another housing different from the housing 30 in shape would be used for holding the terminals 20.

Figure 3:
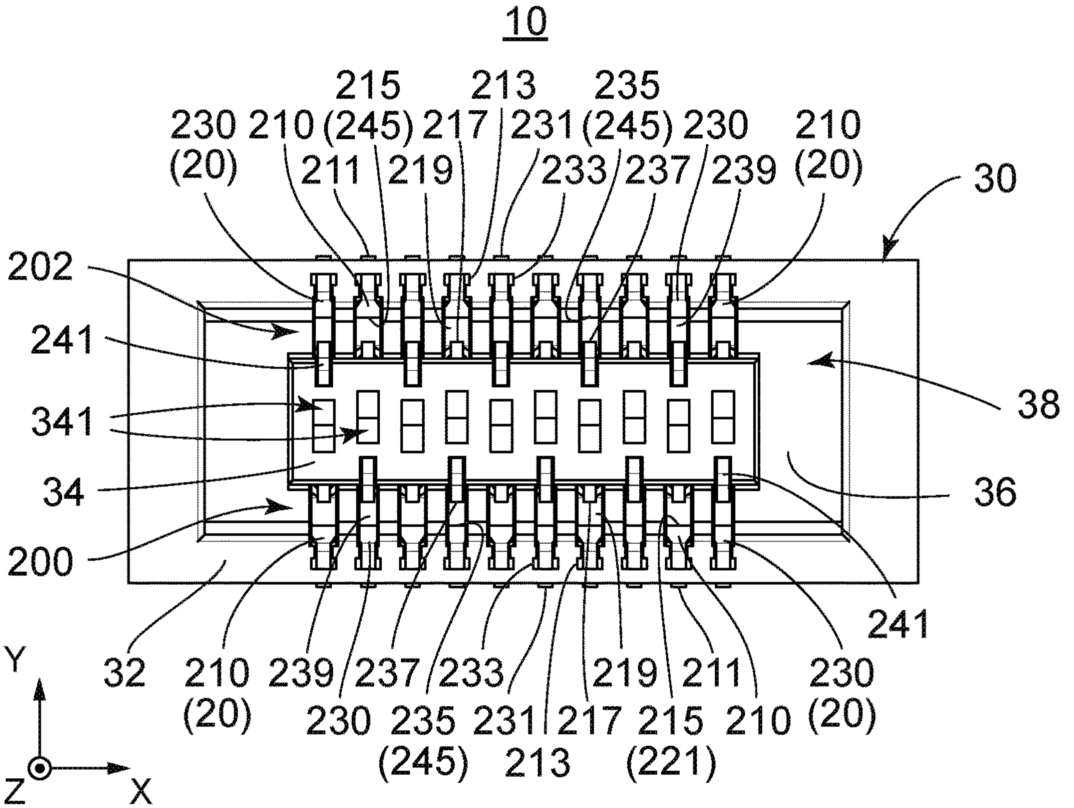
FIG. 3 is a plan view showing the connector of FIG. 1.
Figure 4:
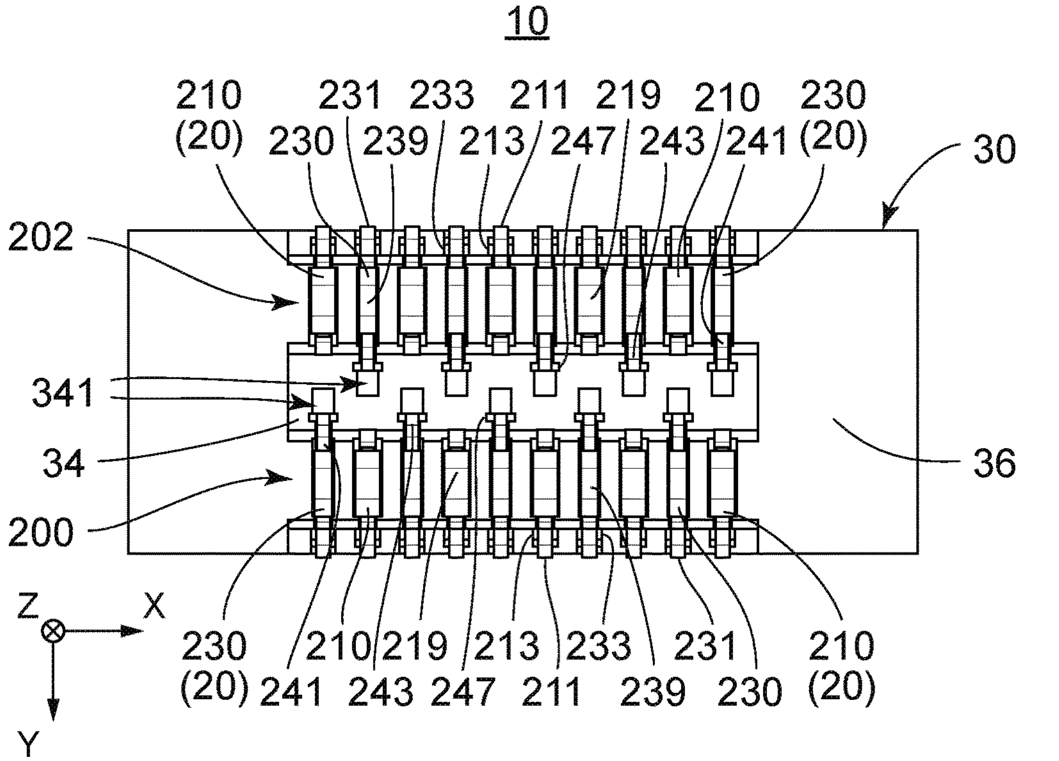
FIG. 4 is a bottom view showing the connector of FIG. 1.

As shown in FIGS. 3 and 4, in each of the terminal rows 200 and 202, the terminals 20 are arranged in a pitch direction. In the present embodiment, the pitch direction is an X-direction. The terminal row 200 and the terminal row 202 are arranged in a width direction perpendicular to the pitch direction. In the present embodiment, the width direction is a Y-direction.

As understood from FIGS. 5 and 6, in the present embodiment, the terminals 20 are press-fit into and held by the housing 30. In detail, the terminals 20 are press-fit into the housing 30 from beneath. However, the present invention is not limited thereto. The terminals 20 may be held by the housing 30 by means of insert-molding. In the present embodiment, an up-down direction is a Z-direction. A positive Z-direction is directed upward while a negative Z-direction is directed downward.

Figure 7:
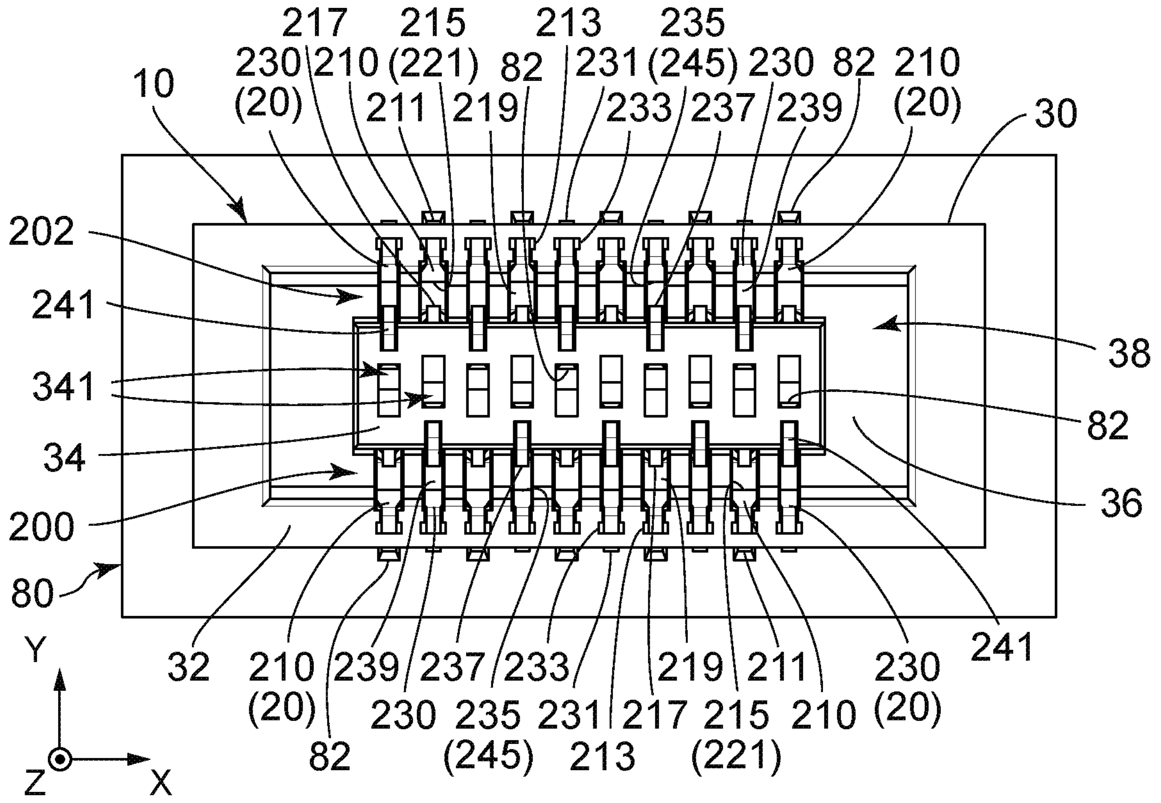
FIG. 7 is a plan view showing a device with the connector of FIG. 1. The connector is mounted on a substrate.
Figure 8:
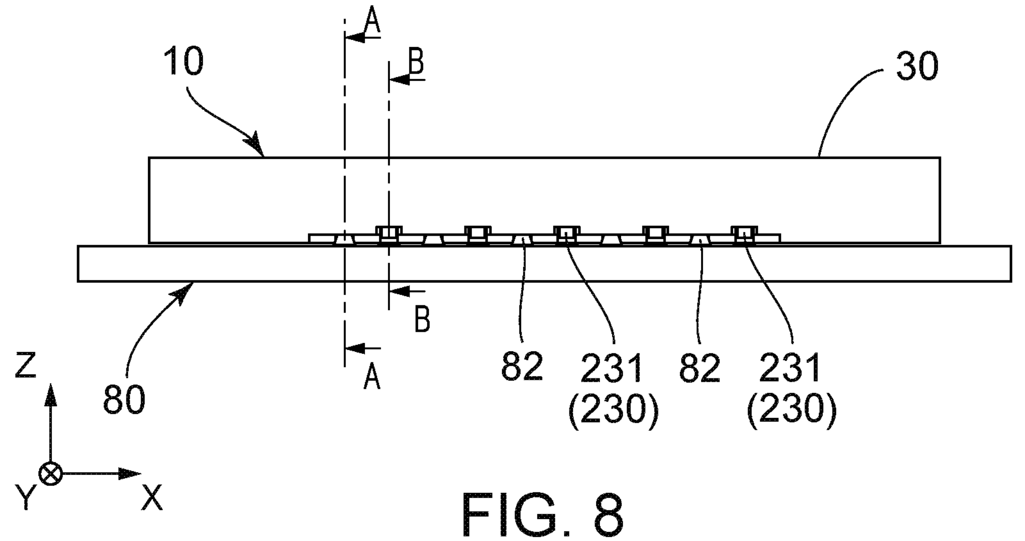
FIG. 8 is a side view showing the device of FIG. 7.
Figure 11:
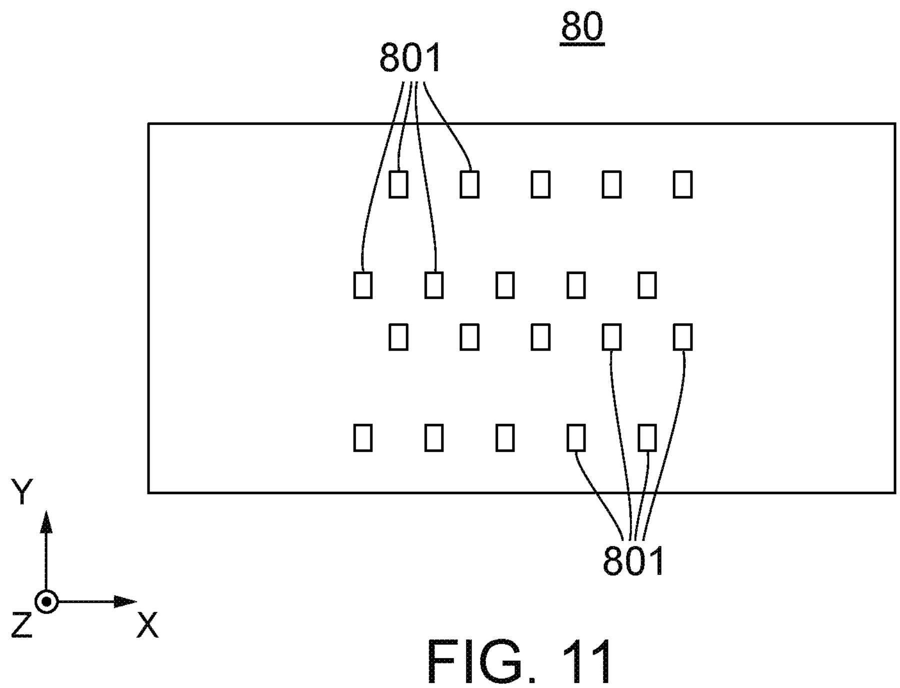
FIG. 11 is a plan view showing the substrate included in the device of FIG. 7.

As shown in FIGS. 7 and 8, the connector 10 is mounted on a substrate 80 so that it forms at least a part of a device when used. As shown in FIG. 11, a plurality of pads 801 is formed on the substrate 80. The pads 801 correspond to the terminals 20, respectively. The pads 801 corresponding to each of the terminal rows 200 and 202 are arranged in staggered arrangement. A configuration of the pads 801 corresponding to one of the terminal rows 200 and 202 and a configuration of the pads 801 corresponding to a remaining one of the terminal rows 200 and 202 are arranged in rotation symmetry about an axis which is perpendicular to the substrate 80 and passes a middle of an area in which the pads 801 are formed.

As understood from FIGS. 5 and 7, the housing 30 has a rectangular shape long in the pitch direction when viewed along an up-down direction perpendicular to both the pitch direction and the width direction. The housing 30 has an external wall portion 32 with a frame shape, an island portion 34 surrounded by the external wall portion 32 and a bottom portion 36 coupling the external wall portion 32 and the island portion 34 with each other.

As shown in FIGS. 5 and 7, the island portion 34 of the housing 30 is provided with a plurality of inspection windows 341. In the present embodiment, the inspection windows 341 are arranged in staggered arrangement. Each of the inspection windows 341 opens upward. The inspection windows 341 correspond to second mount portions 243 (see FIGS. 9 and 10) described later, respectively. The inspection windows 341 are independent of one another, so that the housing 30 is prevented from decreasing strength thereof. Each of the inspection windows 341 allows visible inspection of fixing of the second mount portion 243 corresponding thereto to the substrate 80 therethrough from above under a condition where the connector 10 is mounted on the substrate 80.

Figure 9:
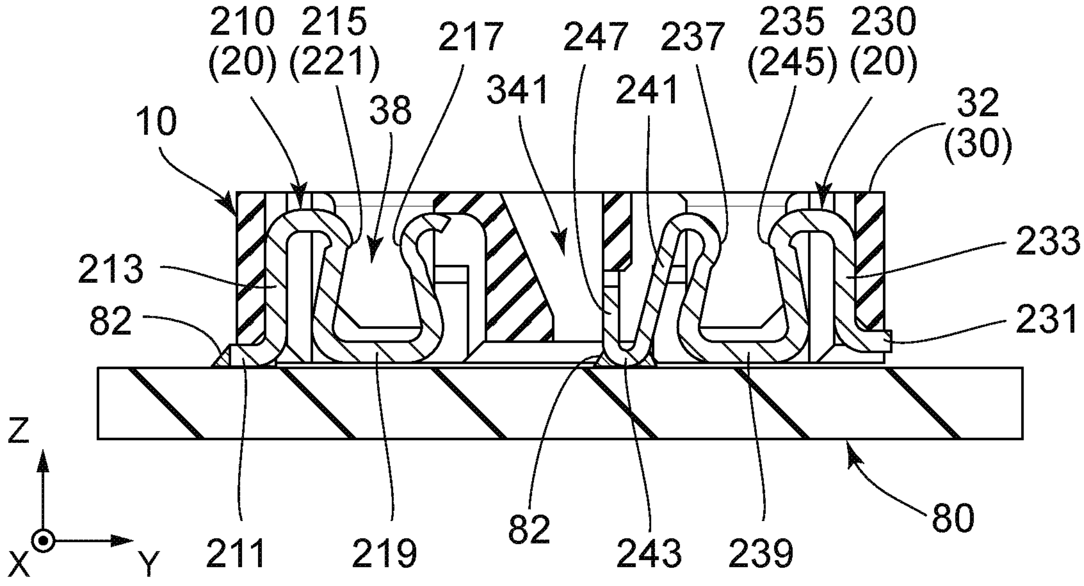
FIG. 9 is a cross-sectional view showing the device of FIG. 8, taken along A-A line.
Figure 10:
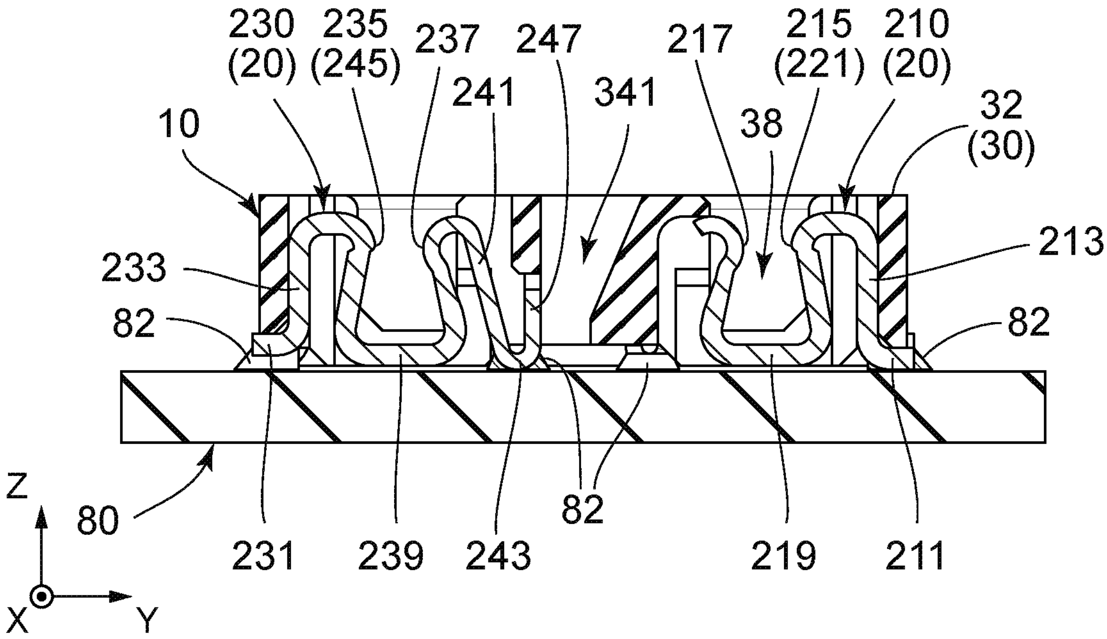
FIG. 10 is a cross-sectional view showing the device of FIG. 8, taken along B-B line.

As understood from FIGS. 8 to 10, the terminals 20 include first terminals 210 and second terminals 230. In the present embodiment, one of two of the terminals 20 adjacent to each other in the width direction is the first terminal 210, and a reaming one of the two terminals 20 is the second terminal 230. If both of the two terminals 20 adjacent to each other in the width direction are the second terminals 230, the second mount portions 243 of them may interfere with each other. In the present embodiment, the two terminals 20 adjacent to each other in the width direction are the first terminal 210 and the second terminal 230. Accordingly, such interference between the terminals 20 can be prevented.

As understood from FIGS. 5 and 6, in each of the terminal rows 200 and 202, the first terminals 210 and the second terminals 230 are alternately arranged in the pitch direction. In the present embodiment, a configuration of the first terminals 210 and the second terminals 230 for one of the terminal rows 200 and 202 and a configuration of the first terminals 210 and the second terminals 230 for a remaining one of the terminal rows 200 and 202 are arranged in rotation symmetry about an axis extending along the up-down direction and passing through a middle between the terminal row 200 and the terminal row 202.

Figure 12:
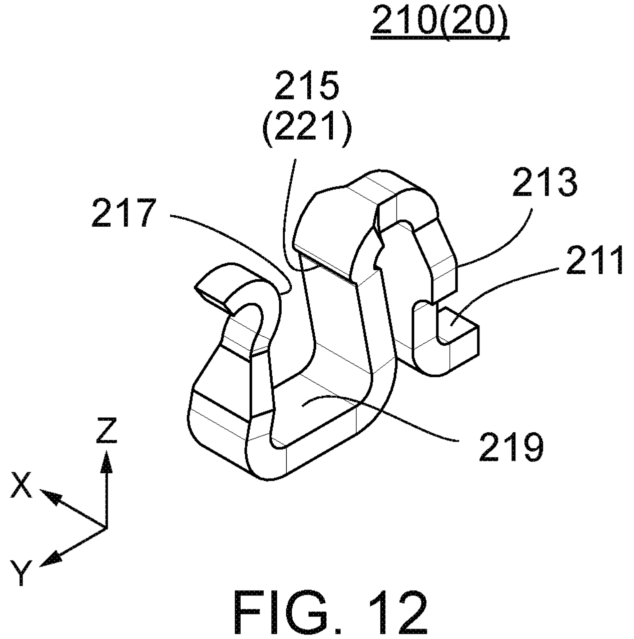
FIG. 12 is a perspective view showing one of first terminals for one of terminal rows included in the connector of FIG. 1.

Referring to FIG. 12, each of the first terminals 210 has a first mount portion 211, a held portion 213, a first contact portion 215, a second contact portion 217 and a supporting portion 219. In the first terminal 210, the held portion 213 is located between the first mount portion 211 and the first contact portion 215. The held portion 213 is held by the housing 30. The first contact portion 215 is located between the held portion 213 and the second contact portion 217 in the width direction. The first contact portion 215 has a protrusion 221 protruding in the width direction. The protrusion 221 extends in the pitch direction. The supporting portion 219 is resiliently deformable at least in part and extends from the first contact portion 215 to support the second contact portion 217. The second contact portion 217 is apart from and faces the first contact portion 215 in the width direction. The second contact portion 217 is movable at least in the width direction by using resilient deformation of the supporting portion 219. In the present embodiment, each of the terminals 20 may be made by punching and bending a sheet metal.

Figure 13:
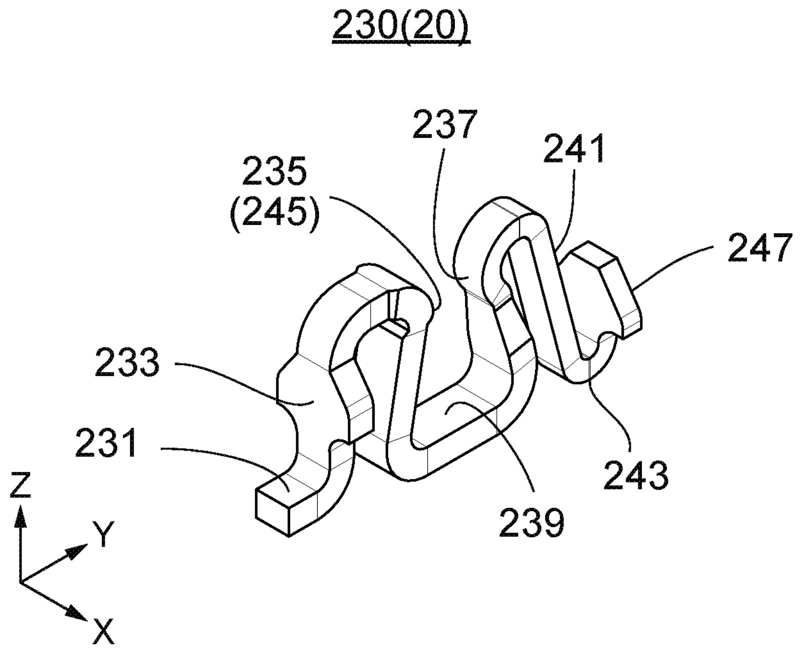
FIG. 13 is a perspective view showing one of second terminals for one of the terminal rows included in the connector of FIG. 1.

Referring to FIG. 13, the second terminal 230 has an end portion 231, a held portion 233, a first contact portion 235, a second contact portion 237, a supporting portion 239, an extension portion 241 and the second mount portion 243.

The end portion 231 of the second terminal 230 is not essential. However, the end portion 231 can be used as a stopper when the second terminal 230 is press-fit into the housing 30. The held portion 233, the first contact portion 235, the second contact portion 237 and the supporting portion 239 are common in function to the held portion 213, the first contact portion 215, the second contact portion 217 and the supporting portion 219 of the first terminal 210, respectively. In detail, in the second terminal 230, the held portion 233 is held by the housing 30. The first contact portion 235 is located between the held portion 233 and the second contact portion 237 in the width direction. The first contact portion 235 has a protrusion 245 protruding in the width direction. The protrusion 245 extends in the pitch direction. The supporting portion 239 is resiliently deformable at least in part and extends from the first contact portion 235 to support the second contact portion 237. The second contact portion 237 is apart from and faces the first contact portion 235 in the width direction. The second contact portion 237 is movable at least in the width direction by using resilient deformation of the supporting portion 239. The extension portion 241 extends from the second contact portion 237, and the second mount portion 243 is formed in a part of the extension portion 241. In the present embodiment, each of the terminals 20 may be made by punching and bending a sheet metal.

As shown in FIG. 13, in the present embodiment, the second terminal 230 further has an additive held portion 247. In other words, in the present embodiment, the extension portion 241 further extends from the second contact portion 237 to the additive held portion 247. As understood from FIGS. 9 to 10, the additive held portion 247 is held by the housing 30. The additive held portion 247 is held by the housing 30, so that movement of the second mount portion 243 with respect to the housing 30 can be prevented or suppressed. In detail, the second mount portion 243 is located relatively farther from the held portion 233. In addition, between the held portion 233 and the second mount portion 243, the supporting portion 239 which is resiliently deformable exists. Accordingly, the second mount portion 243 can be moved with respect to the housing 30 when the second mount portion 243 is received an external force before being mounted on the substrate 80. The additive held portion 247 prevents this movement of the second mount portion 243.

As understood from FIGS. 3, 4 and 13, the extension portion 241 of the second terminal 230 has a size smaller than that of the supporting portion 239 in the pitch direction. Moreover, as understood from FIG. 14, the extension portion 241 of the second terminal 230 has a board thickness thinner than that of the supporting portion 239. In the second terminal 230, when the second mount portion 243 is fixed to the substrate 80, the resilient deformation of the supporting portion 239 is restricted. In order to ease the resilient deformation of the supporting portion 239, the size in the pitch direction and the board thickness of the extension portion 241 are reduced. As a method for reducing the board thickness of the extension portion 241, coining can be used.

Figure 14:
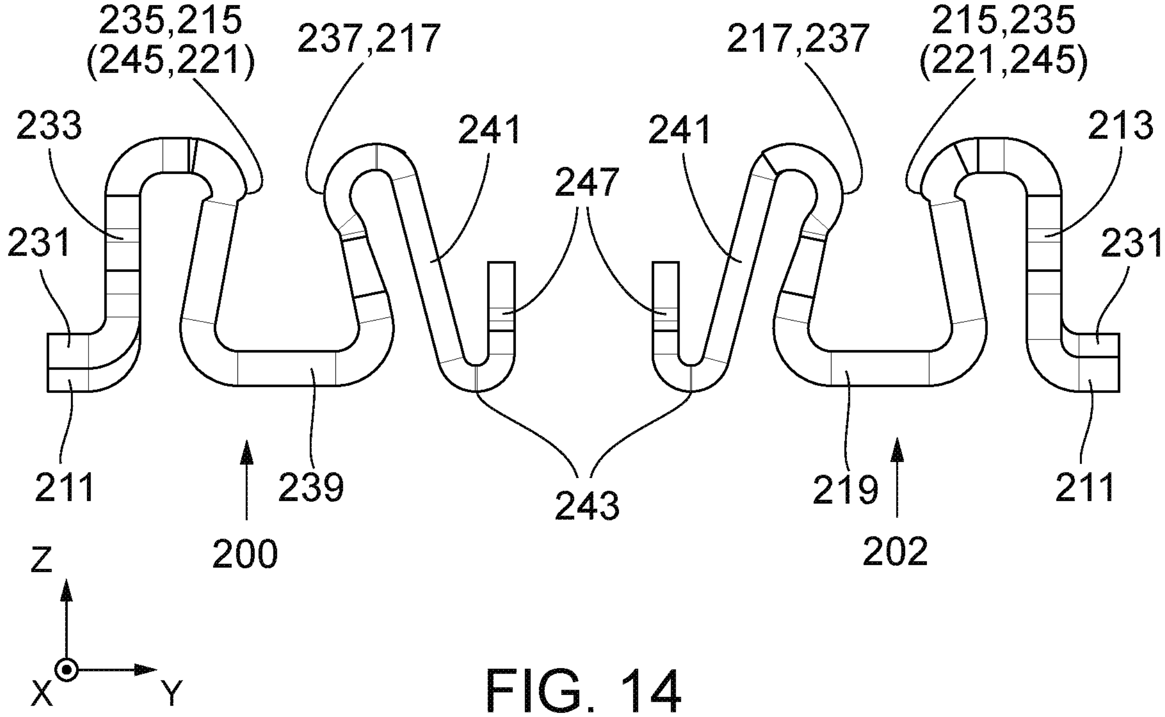
FIG. 14 is a front view showing the terminal rows included in the connector of FIG. 1.
Figure 15:
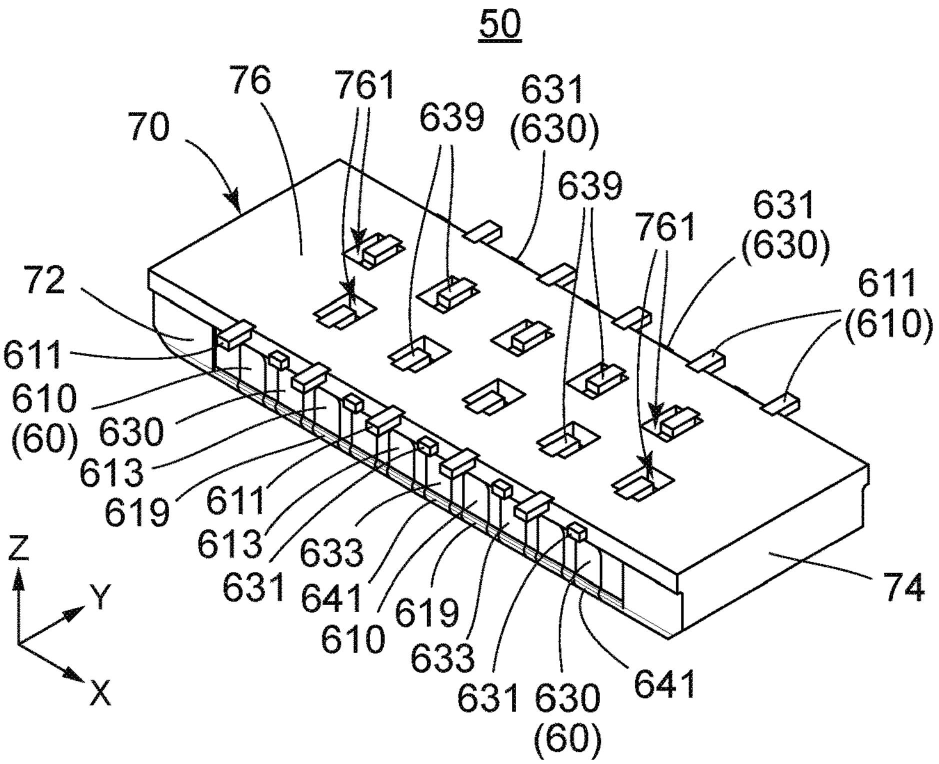
FIG. 15 is a top, perspective view showing a mating connector mateable with the connector of FIG. 1.
Figure 16:
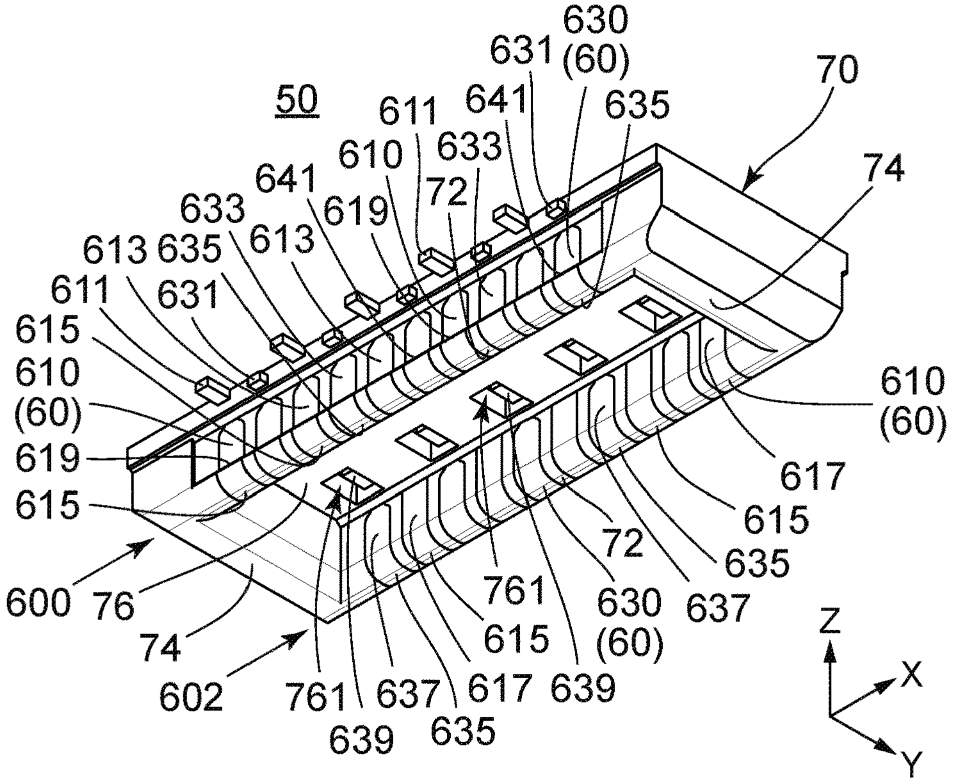
FIG. 16 is a bottom, perspective view showing the mating connector of FIG. 15.

Referring to FIG. 14, when viewed along the pitch direction, in each of the terminal rows 200 and 202, a part of the first terminal 210 from the held portion 213 to the second contact portion 217 is identical with a part of the second terminal 230 from the held portion 233 to the second contact portion 237. In other words, in a plane perpendicular to the pitch direction, positions of the held portion 213, the first contact portion 215, the supporting portion 219 and the second contact portion 217 of the first terminal 210 are identical with positions of the held portion 233, the first contact portion 235, the supporting portion 239 and the second contact portion 237 of the second terminal 230, respectively.

As understood from FIG. 5 in addition to FIG. 14, when viewed along the pitch direction, in each of the terminal rows 200 and 202, the protrusion 221 and the protrusion 245 are identical with each other. Moreover, as shown in FIG. 14, in each of the terminal rows 200 and 202, the second mount portion 243 is located apart from the first mount portion 211 in the width direction.

As understood from FIGS. 3, 4, 12 and 13, in the present embodiment, the part of the first terminal 210 from the held portion 213 to the second contact portion 217 does not have a shape same as that of the part of the second terminal 230 from the held portion 233 to the second contact portion 237. In detail, the part of the first terminal 210 from the held portion 213 to the second contact portion 217 and the part of the second terminal 230 from the held portion 233 to the second contact portion 237 are different from each other in size in the pitch direction. This is to match resiliency of the first terminal 210 and resiliency of the second terminal 230 with each other. However, the present invention is not limited thereto. Provided that a difference between the resiliency of the first terminal 210 and the resiliency of the second terminal 230 is in a permissible range, the part of the first terminal 210 from the held portion 213 to the second contact portion 217 and the part of the second terminal 230 from the held portion 233 to the second contact portion 237 may have the same shapes.

As understood from FIGS. 7 to 10, when the connector 10 is mounted on the substrate 80, the first mount portion 211 of the first terminal 210 and the second mount portion 243 of the second terminal 230 are fixed to the pads 801 on the substrate 80 (see FIG. 11) which correspond to them, respectively, by using solder 82. In the present embodiment, the two terminals 20 adjacent to each other in the pitch direction are the first terminal 210 and the second terminal 230. The first mount portion 211 of the first terminal 210 and the second mount portion 243 of the second terminal 230 are apart from each other in the width direction. Accordingly, intervals of the pads 801 arranged in the pitch direction are wider than intervals of the terminals 20 arranged in the pitch direction. With this structure, a short circuit caused by the solder 82 between the pads 801 adjacent to each other in the pitch direction can be prevented.

As understood from FIGS. 7 to 10, when the connector 10 is mounted on the substrate 80, fixing of the first mount portion 211 and the second mount portions 243 on the substrate 80 is visible from above in the up-down direction. In detail, in the present embodiment, each of the first mount portions 211 is located outside the housing 30 in the width direction in part, so that the fixing of the first mount portion 211 on the substrate 80 is visible from above or diagonally above the substrate 80. Moreover, in the present embodiment, the housing 30 is provided with the inspection windows 341 corresponding to the second mount portions 243, respectively, so that the fixing of each of the second mount portions 243 on the substrate 80 is visible through the inspection window 341 corresponding thereto with keeping strength of the housing 30.

As mentioned above, in the present embodiment, the first mount portion 211 and the second mount portion 243 of the terminals 20 adjacent to each other in the pitch direction are apart from each other in the width direction. The pads 801 on the substrate 80 which correspond to the first mount portions 211 and the second mount portions 243 are arranged in staggered arrangement as shown in FIG. 11. In other words, the two pads 801 which are closest to each other in the pitch direction are not on a straight line extending in the pitch direction. Accordingly, it is unnecessary to leave a space in the pitch direction between the two pads 801 closest to each other in the pitch direction. In fact, it is possible to arrange the two pads 801 closest to each other in the pitch direction so that they overlap with each other in the pitch direction. Accordingly, in the pitch direction, pitches of the pads 801 can be reduced. Thus, restriction derived from the pads 801 for the connector 10 is eased, and a distance between the two terminals 20 adjacent to each other in the pitch direction can be reduced. This contributes to small-sizing the connector 10 or increasing the number of the terminals 20.

In addition, in the present embodiment, the positions of the first contact portion 215 or 235 and the second contact portion 217 or 237 of each of the terminals 20 in each of the terminal rows 200 and 202 are identical with those of any other of the terminals 20. With this structure, it is easy to control an insertion and extraction force of the connector 10 with respect to a mating connector 50. Accordingly, restriction derived from the insertion and extraction force is eased when intending to increase the number of the terminals 20 of the connector 10. Moreover, setting the insertion and extraction force to a minimum allows abrasion of the terminals 20 to be suppressed, and thereby high connection reliability can be obtained.

Referring to FIGS. 15 to 18, the mating connector 50 is provided with a plurality of mating terminals 60 and a mating housing 70 which holds the mating terminals 60. The mating connector 50 is formed so that it is mateable with the connector 10 in the up-down direction and forms an assembly (see FIG. 29) together with the connector 10. In the present embodiment, each of the mating terminals 60 is formed of a sheet metal, and the mating housing 70 is made of insulating resin. In the present embodiment, the mating terminals 60 are held by the mating housing 70 by insert-molding. However, the present invention is not limited thereto. The mating terminals 60 may be held by the mating housing 70 by press-fitting.

Figure 17:
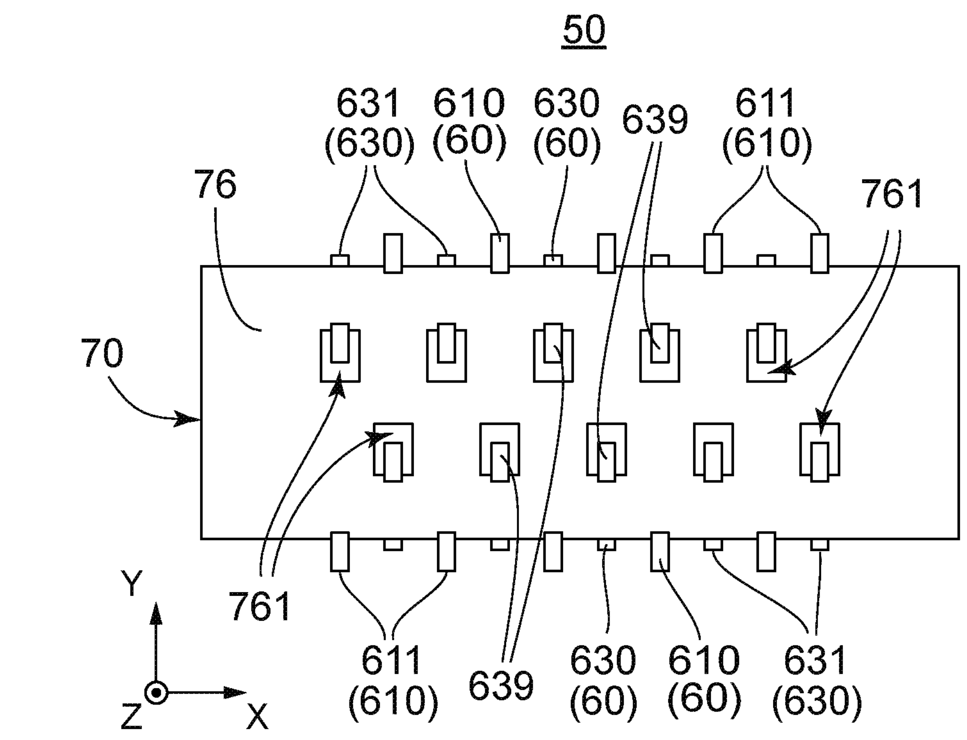
FIG. 17 is a plan view showing the mating connector of FIG. 15.
Figure 18:
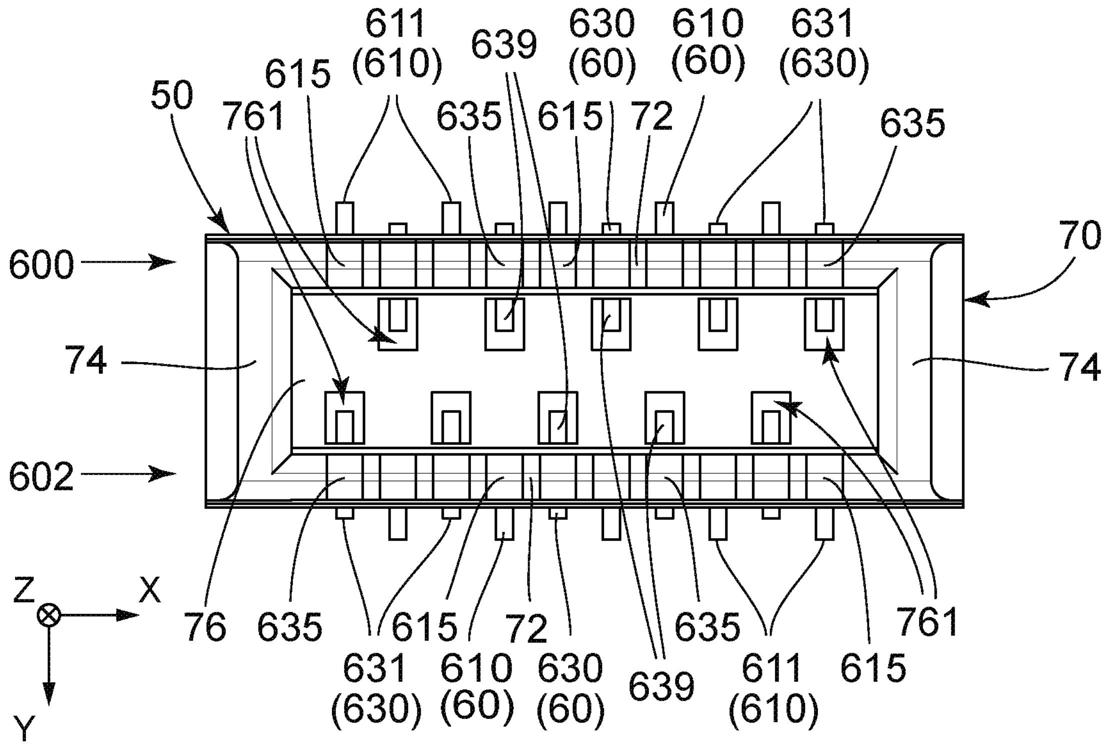
FIG. 18 is a bottom view showing the mating connector of FIG. 15.

As shown in FIGS. 17 and 18, the mating housing 70 has a rectangular shape long in the pitch direction when viewed along the up-down direction. Moreover, the mating housing 70 has a pair of long walls 72, short walls 74 coupling the long walls 72 to each other, and an upper portion 76. The upper portion 76 of the mating housing 70 is provided with mating inspection windows 761 corresponding to second mating mount portions 639 mentioned later, respectively.

Figure 19:
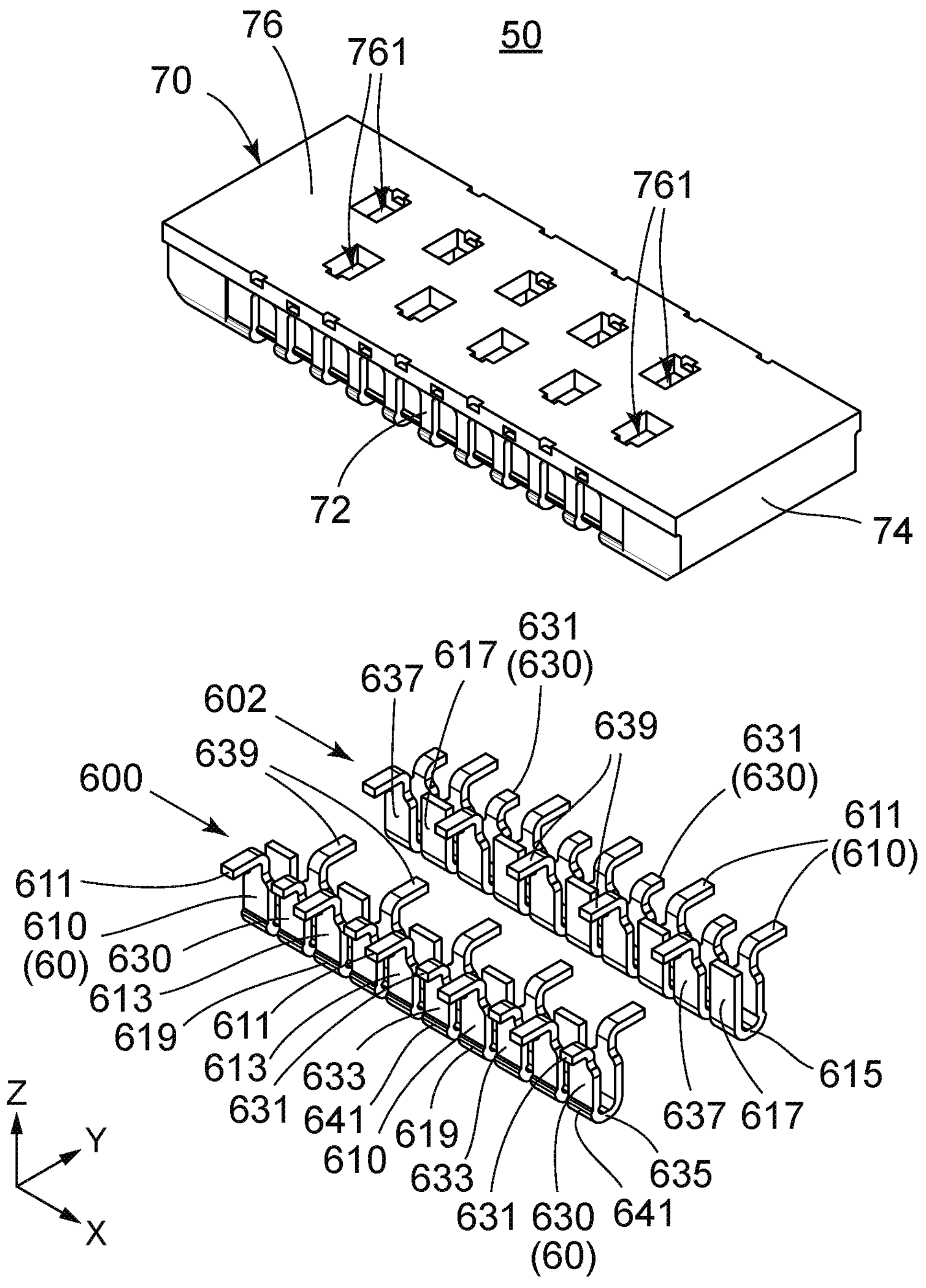
FIG. 19 is an exploded, top, perspective view showing the mating connector of FIG. 15.
Figure 20:
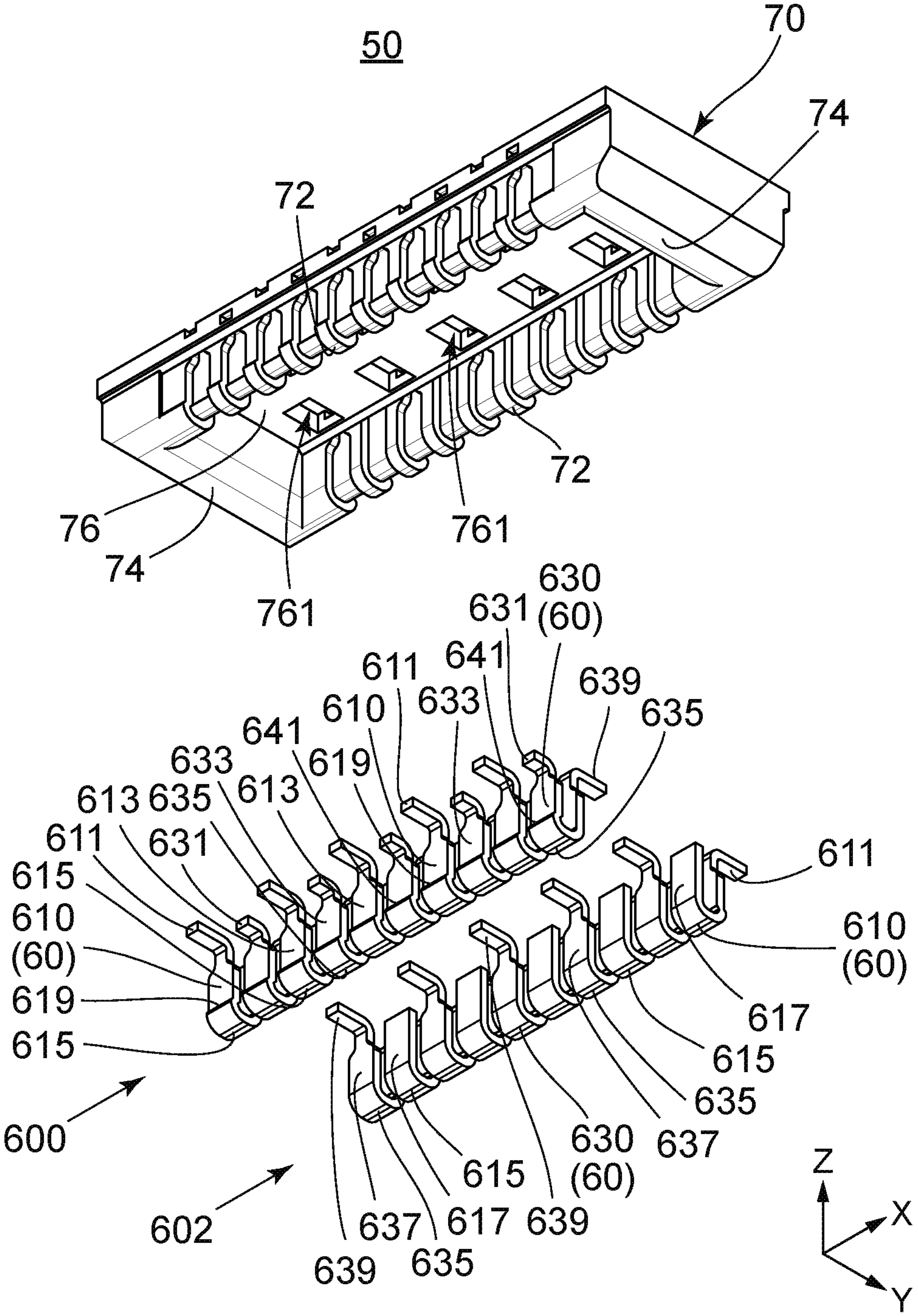
FIG. 20 is an exploded, bottom, perspective view showing the mating connector of FIG. 15.

As shown in FIGS. 18 to 20, the mating terminals 60 are arranged into two rows so that they correspond to the long walls 72 and form mating terminal rows 600 and 602. In each of the mating terminal rows 600 and 602, the mating terminals 60 are arranged in the pitch direction. The mating terminals 60 correspond to the terminals 20 of the connector 10, respectively. When the mating connector 50 and the connector 10 are mated with each other, each of the mating terminals 60 is brought into contact with the terminal 20 corresponding thereto.

Figure 21:
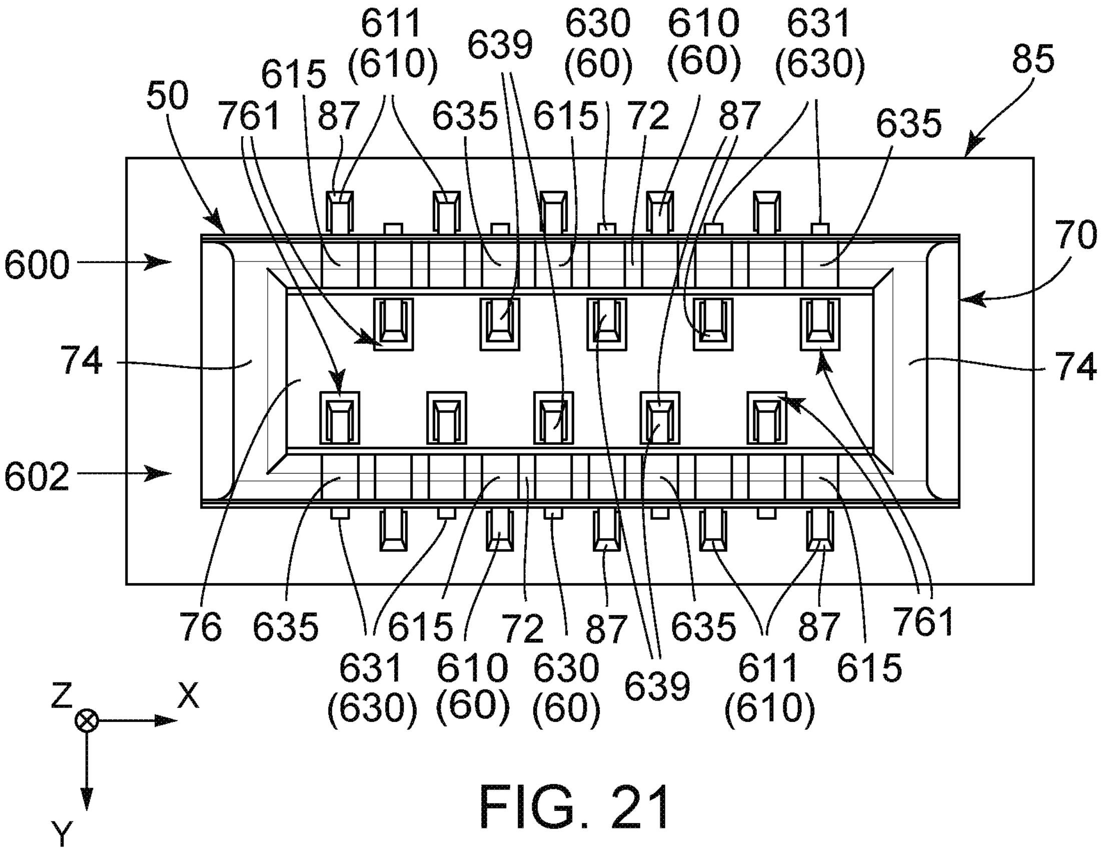
FIG. 21 is a bottom view showing a mating device with the mating connector of FIG. 15. The mating connector is mounted on the mating substrate.
Figure 22:
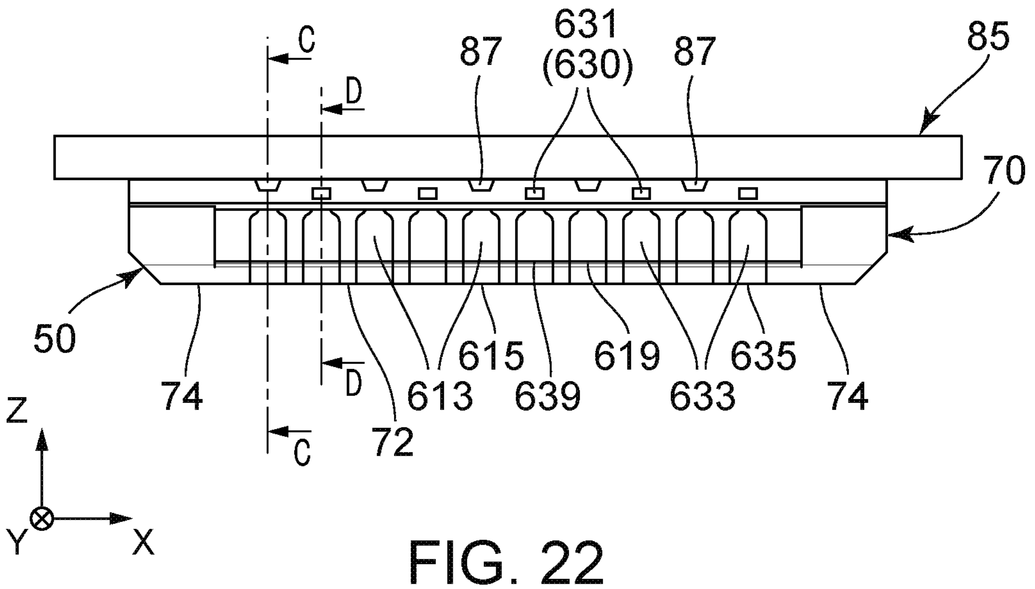
FIG. 22 is a side view showing the mating device of FIG. 21.
Figure 25:
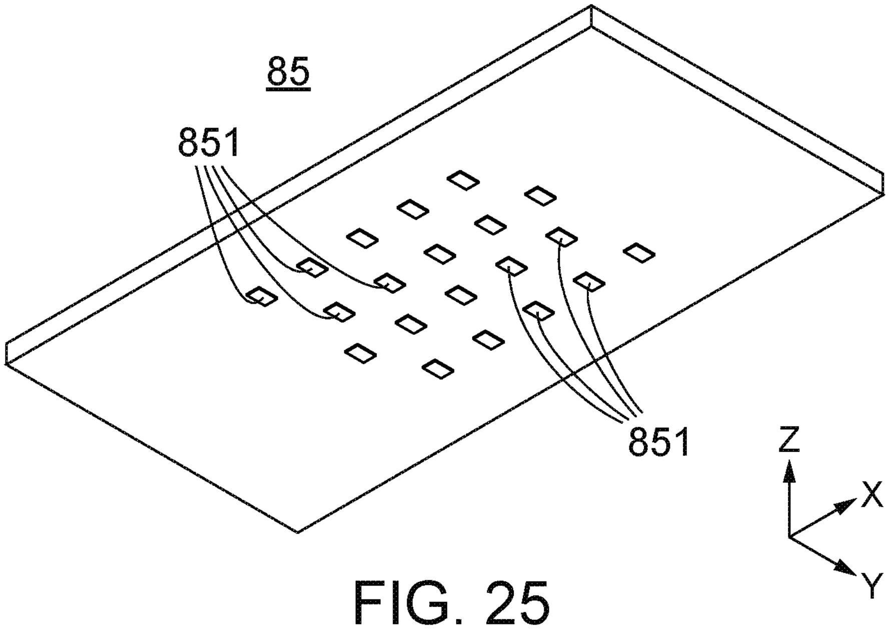
FIG. 25 is a bottom, perspective view showing the mating substrate included in the mating device of FIG. 21.

As shown in FIGS. 21 and 22, the mating connector 50 is mounted on a mating substrate 85 and forms a mating device at least in part. As shown in FIG. 25, a plurality of mating pads 851 is formed on the mating substrate 85. The mating pads 851 correspond to the mating terminals 60, respectively. The mating pads 851 corresponding to each of the mating terminal rows 600 and 602 are arranged in a staggered arrangement. A configuration of the mating pads 851 corresponding to one of the mating terminal rows 600 and 602 and a configuration of the mating pads 851 corresponding to a remaining one of the mating terminal rows 600 and 602 are arranged in rotation symmetry about an axis which is perpendicular to the mating substrate 85 and passes through a middle of an area in which the mating pads 851 are formed.

Figure 23:
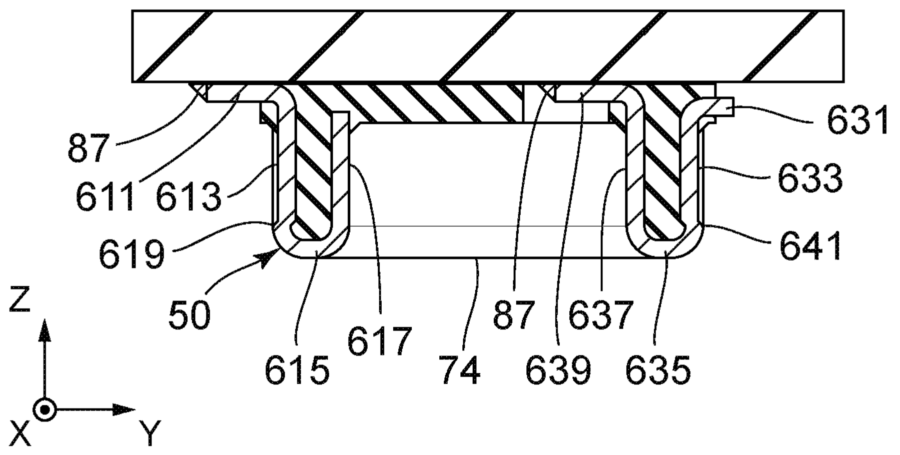
FIG. 23 is a cross-sectional view showing the mating device of FIG. 22, taken along C-C line.
Figure 24:
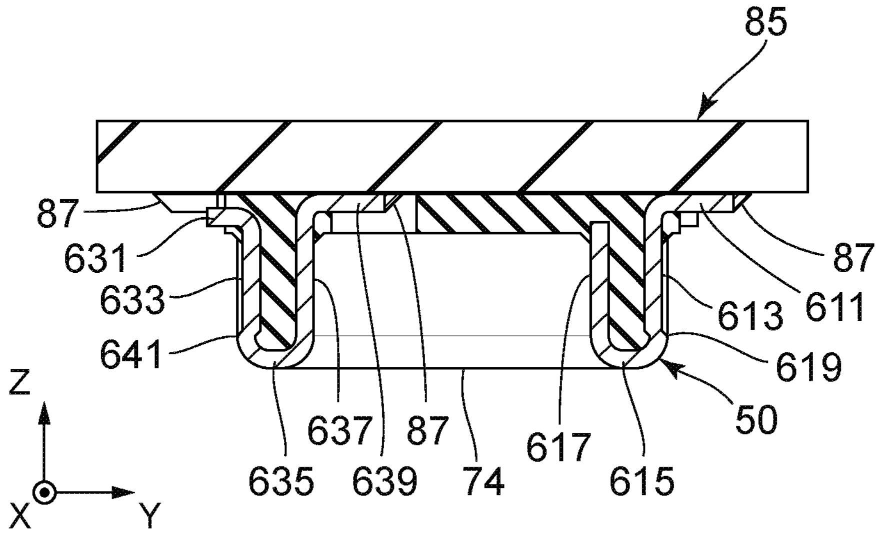
FIG. 24 is a cross-sectional view showing the mating device of FIG. 22, taken along D-D line.
Figure 26:
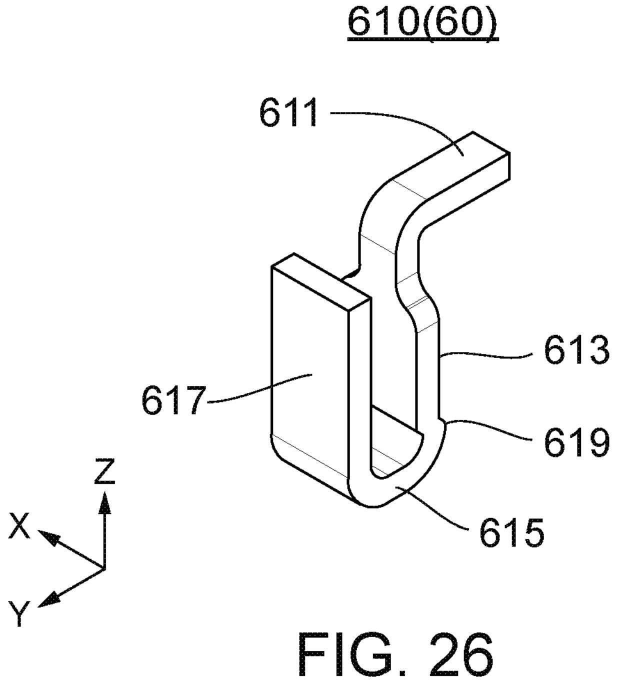
FIG. 26 is a perspective view showing one of first mating terminals for one of terminal rows included in the mating connector of FIG. 15.
Figure 27:
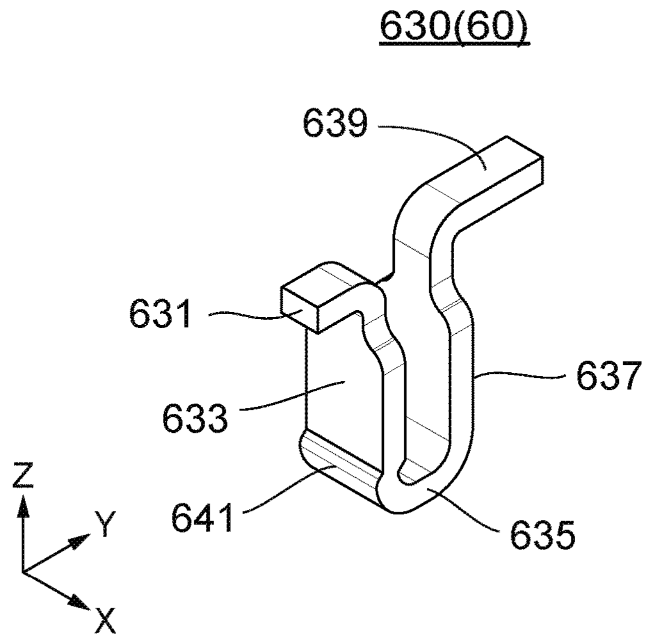
FIG. 27 is a perspective view showing one of second mating terminals for one of the terminal rows included in the mating connector of FIG. 15.

Referring to FIGS. 23 and 24, the mating terminals 60 include two types of mating terminals 610 and 630 which are different from each other in shape, i.e., first mating terminals 610 (see FIG. 26) and second mating terminals 630 (see FIG. 27). The first mating terminals 610 correspond to the first terminals 210 of the connector 10. The second mating terminals 630 correspond to the second terminals 230 of the connector 10.

As understood from FIGS. 19 and 20, each of the mating terminal rows 600 and 602 is formed by arranging the first mating terminals 610 and the second mating terminals 630 alternately. In other words, one of two of the mating terminals 60 adjacent to each other in the pitch direction is the first mating terminal 610, and a remaining one of them is the second mating terminal 630.

As shown in FIG. 26, the first mating terminal 610 has a first mating mount portion 611, a first mating contact portion 613, a coupling portion 615 and a second mating contact portion 617. The first mating contact portion 613 has a protrusion 619 protruding in the width direction. The protrusion 619 extends in the pitch direction. In the first mating terminal 610, the first mating contact portion 613 is located between the first mating mount portion 611 and the second mating contact portion 617. The first mating contact portion 613 and the second mating contact portion 617 of the first mating terminal 610 are brought into contact with the first contact portion 215 and the second contact portion 217 of the first terminal 210 corresponding thereto, respectively, when the connector 10 and the mating connector 50 are mated with each other.

As shown in FIG. 27, the second mating terminal 630 has an end portion 631, a first mating contact portion 633, a coupling portion 635, a second mating contact portion 637 and the second mating mount portion 639. The first mating contact portion 613 has a protrusion 641 protruding in the width direction. The protrusion 641 extends in the pitch direction. In the second mating terminal 630, the second mating contact portion 637 is located between the first mating contact portion 633 and the second mating mount portion 639. The first mating contact portion 633, the coupling portion 635 and the second mating contact portion 637 are common in function to the first mating contact portion 613, the coupling portion 615 and the second mating contact portion 617 of the first mating terminal 610, respectively. The first mating contact portion 633 and the second mating contact portion 637 of the second mating terminal 630 are brought into contact with the first contact portion 235 and the second contact portion 237 of the second terminal 230 corresponding thereto, respectively, when the connector 10 and the mating connector 50 are mated with each other.

Figure 28:
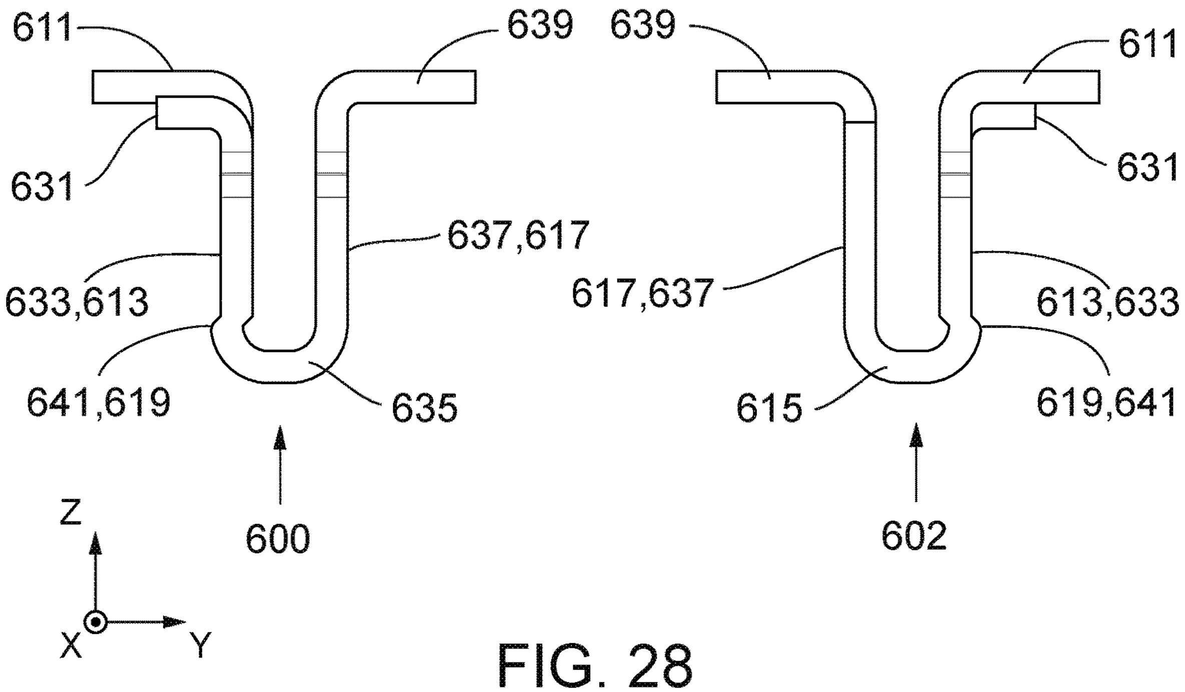
FIG. 28 is a front view showing the mating terminal rows included in the mating connector of FIG. 15.

Referring to FIG. 28, when viewed along the pitch direction, in each of the mating terminal rows 600 and 602, a part of the first mating terminal 610 from the first mating contact portion 613 to the second mating contact portion 617 is identical with a part of the second mating terminal 630 from the first mating contact portion 633 to the second mating contact portion 637. In other words, in a plane perpendicular to the pitch direction, positions of the first mating contact portion 613, the coupling portion 615 and the second mating contact portion 617 of the first mating terminal 610 are identical with positions of the first mating contact portion 633, the coupling portion 635 and the second mating contact portion 637 of the second mating terminal 630, respectively.

As understood from FIGS. 28, 19 and 20, when viewed along the pitch direction, in each of the mating terminal rows 600 and 602, the protrusions 619 of the first mating terminals 610 and the protrusions 641 of the second mating terminals 630 are identical with each other. As shown in FIG. 28, in each of the mating terminal rows 600 and 602, the second mating mount portions 639 are located apart from the first mating mount portions 611 in the width direction.

As shown in FIGS. 23 and 24, when the mating connector 50 is mounted on the mating substrate 85, the first mating mount portion 611 of the first mating terminal 610 is fixed to the mating pad 851, which corresponds thereto, on the mating substrate 85 (see FIG. 25) by using solder 87. Similarly, the second mating mount portion 639 of the second mating terminal 630 is fixed to the mating pad 851, which corresponds thereto, on the mating substrate 85 by using solder 87.

As understood from FIG. 21, when the mating connector 50 is mounted on the mating substrate 85, fixing of the first mating mount portions 611 and the second mating mount portions 639 to the mating substrate 85 is visible from beneath. In detail, in the present embodiment, the first mating mount portions 611 are outside the mating housing 70 in the width direction. Accordingly, the fixing of the first mating mount portions 611 to the mating substrate 85 is visible from below the mating substrate 85. In the present embodiment, the upper portion 76 of the mating housing 70 is provided with the mating inspection windows 761 corresponding to the second mating mount portions 639, respectively. Accordingly, the fixing of the second mating mount portions 639 to the mating substrate 85 is visible through the mating inspection windows 761 with keeping strength of the mating housing 70.

Figure 29:
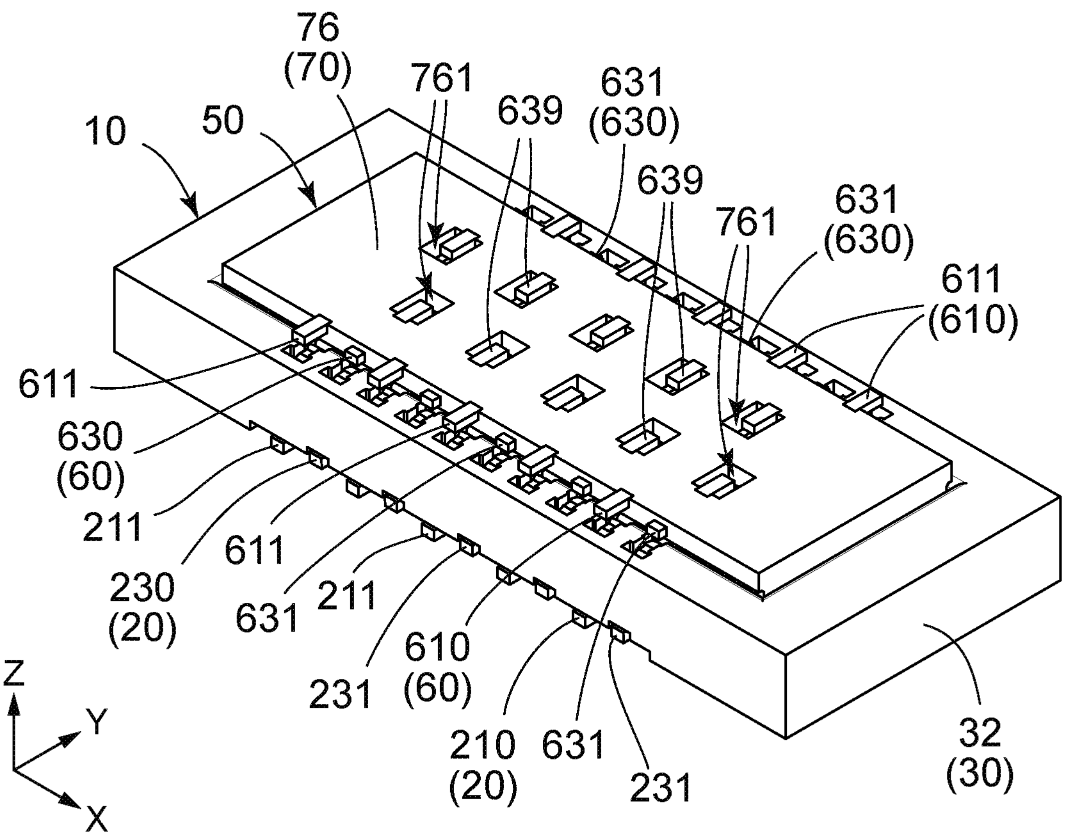
FIG. 29 is a perspective view showing an assembly having the connector of FIG. 1 and the mating connector of FIG. 15. The connector and the mating connector are in a mated state.
Figure 30:
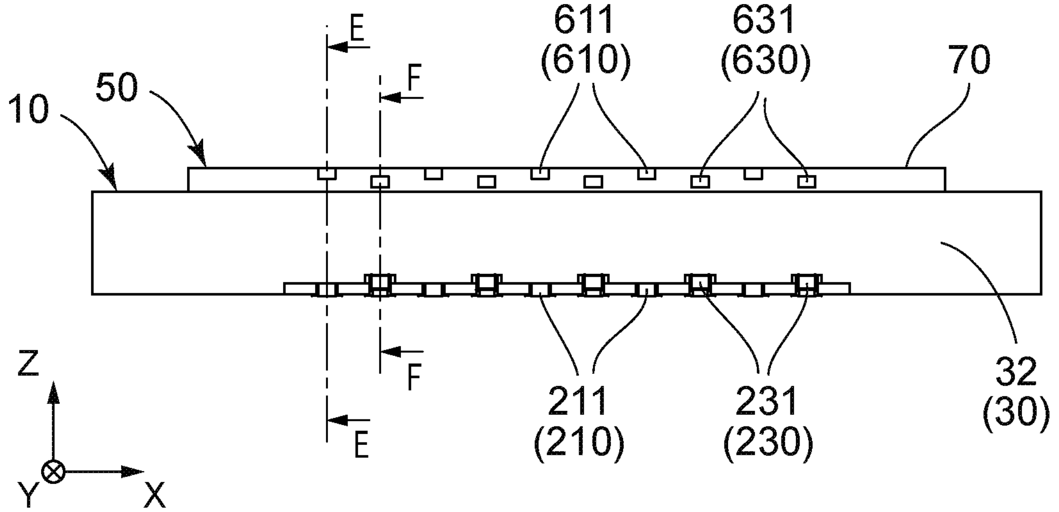
FIG. 30 is a side view showing the assembly of FIG. 29.

As shown in FIGS. 29 and 30, when the connector 10 and the mating connector 50 are mated with each other, the mating connector 50 is partly received by a receiving portion 38 of the connector 10 (see FIG. 1).

Figure 31:
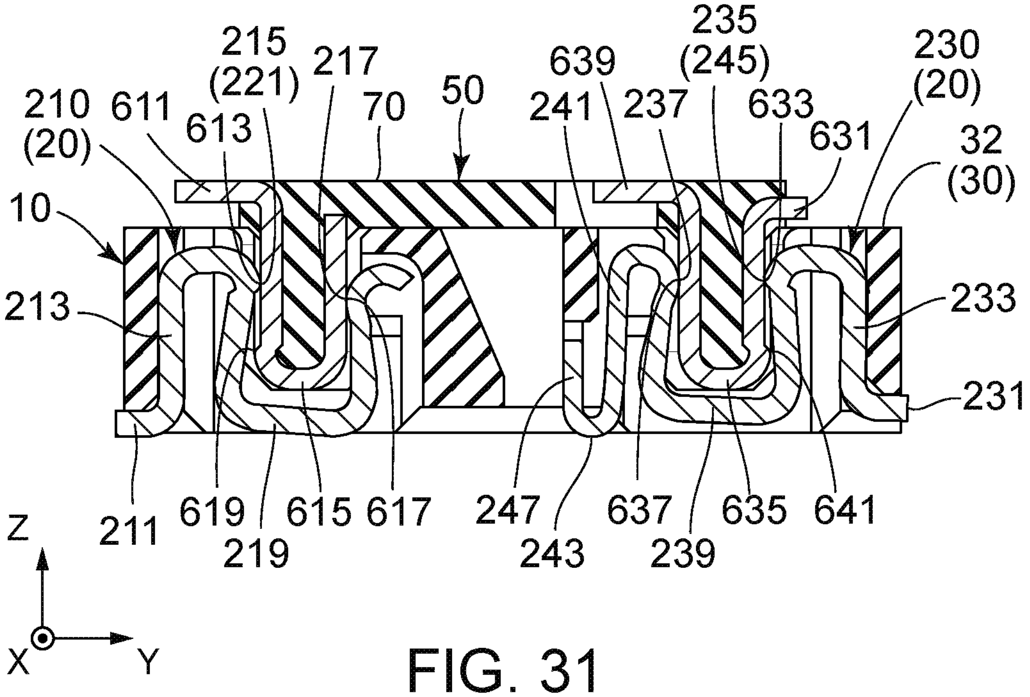
FIG. 31 is a cross-sectional view showing the assembly of FIG. 30, taken along E-E line.
Figure 32:
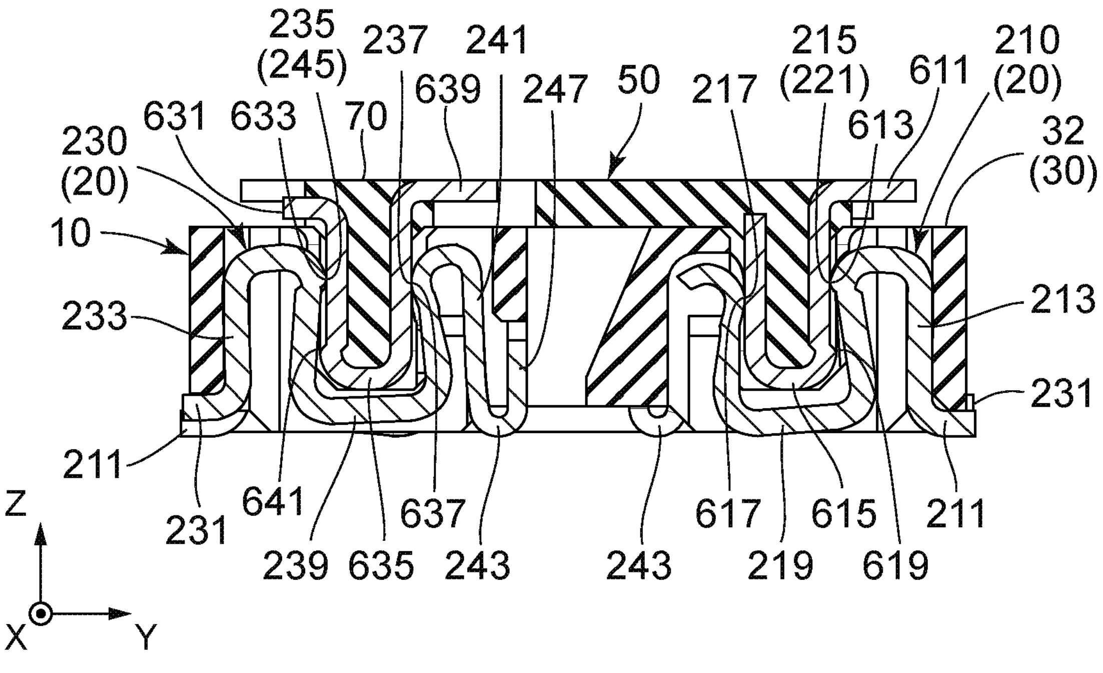
FIG. 32 is a cross-sectional view showing the assembly of FIG. 30, taken along F-F line.

Referring to FIGS. 31 and 32, in a mated state that the connector 10 and the mating connector 50 are mated with each other, each of the mating terminals 60 is partly inserted into between the first contact portion 215 or 235 and the second contact portion 217 or 237 of the terminal 20 corresponding to the mating terminal 60. Each of the second contact portions 217 and 237 of the connector 10 is movable in the width direction due to resilient deformation of the supporting portion 219 or 239 and allows entering of the mating terminal 60 corresponding thereto. As a result, each of the terminals 20 and the mating terminal 60 corresponding thereto are brought into contact with and are electrically connected to each other. In detail, the first contact portion 215 or 235 and the second contact portion 217 or 237 of each of the terminals 20 of the connector 10 are brought into contact with the first mating contact portion 613 or 633 and the second mating contact portion 617 or 633 of the mating terminal 60 corresponding thereto, respectively.

As shown in FIGS. 31 and 32, in the mated state that the connector 10 and the mating connector 50 are mated with each other, each of the protrusions 221 and 245 of the terminals 20 of the connector 10 is located upward of the protrusion 619 or 641 of the mating terminal 60, which corresponds thereto, of the mating connector 50 in the up-down direction. With this structure, the connector 10 and the mating connector 50 are prevented from being moved in separation directions. Thus, the first contact portions 215 and 235 of the connector 10 and the first mating contact portions 613 and 633 of the mating connector 50 serve as lock portions and mating lock portions, respectively, which lock the mated state of the connector 10 and the mating connector 50.

Also in the mating connector 50 of the present embodiment, similarly to the connector 10, a distance between the two mating terminals 60 adjacent to each other in the pitch direction can be reduced.

Second Embodiment

Figure 33:
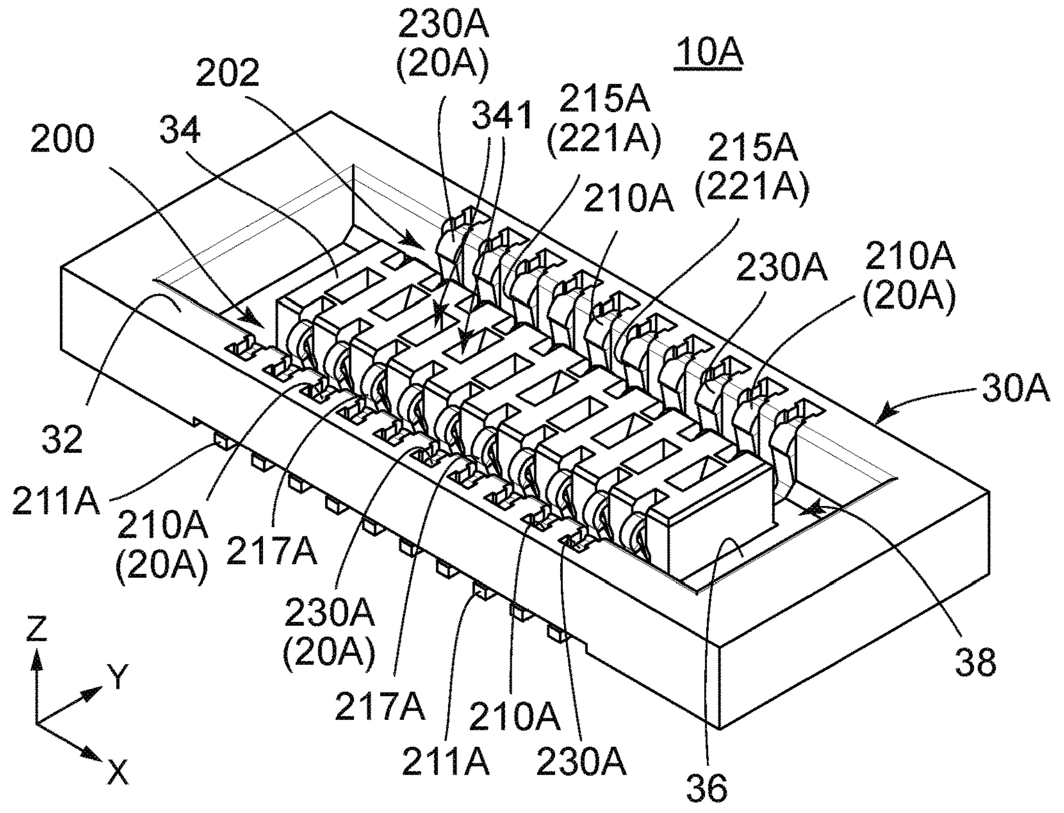
FIG. 33 is a top, perspective view showing a connector according to a second embodiment of the present invention.
Figure 34:
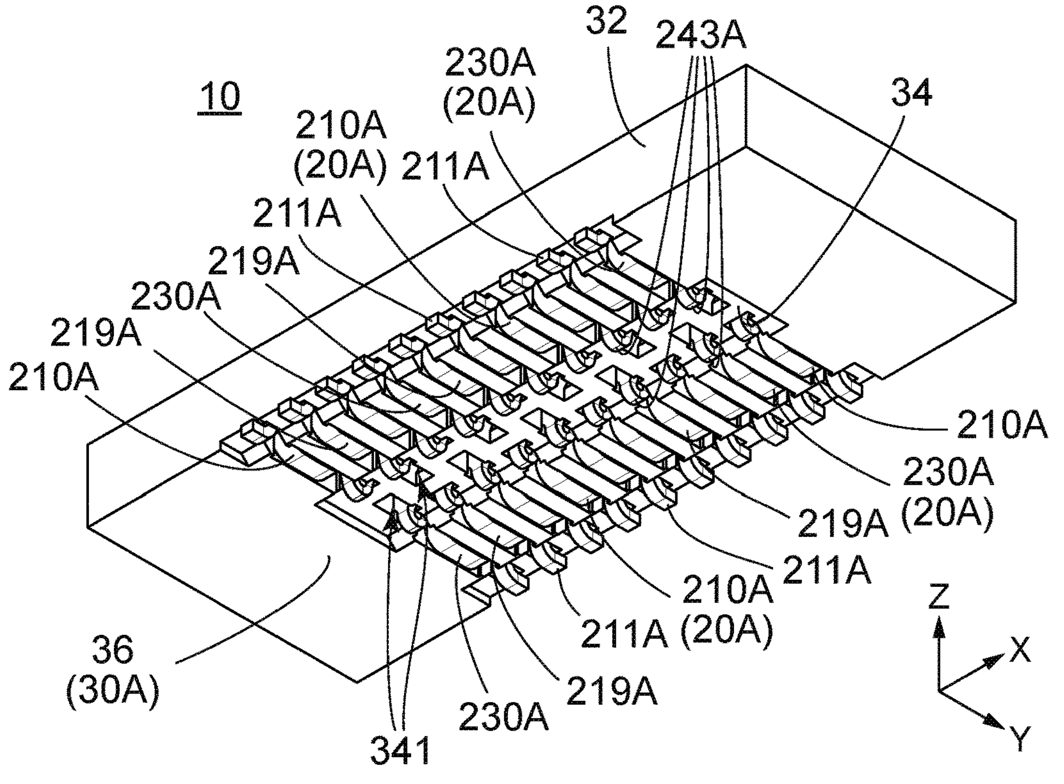
FIG. 34 is a bottom, perspective view showing the connector of FIG. 33.

Referring to FIGS. 33 and 34, a connector 10A according to a second embodiment of the present invention is formed similarly to the connector 10 of the first embodiment. In detail, the connector 10A is provided with a plurality of terminals 20A and a housing 30A which holds the terminals 20A.

Figure 35:
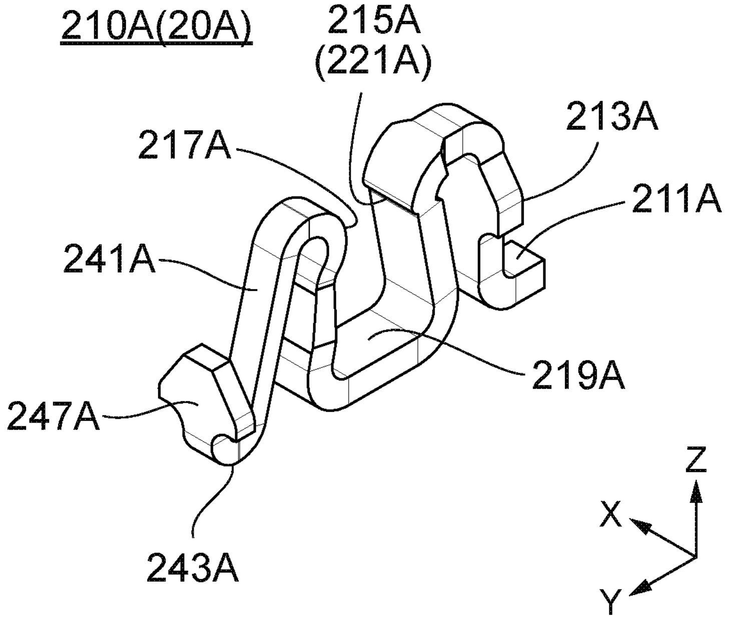
FIG. 35 is a perspective view showing one of first terminals of one of terminal rows included in the connector of FIG. 33.

As understood from FIGS. 35 and 35, in the present embodiment, first terminals 210A and second terminals 230A have shapes same as each other. With this structure, the number of kinds of parts can be reduced. However, the present invention is not limited thereto. The first terminal 210A and the second terminal 230A may have different shapes from each other. For example, the first terminal 210A may have one or more portions different from those of the second terminal 230A in size in the pitch direction. In that case, when viewed along the pitch direction, the first terminal 210A and the second terminal 230A which are adjacent to each other in the pitch direction may be identical with each other in shape.

Figure 36:
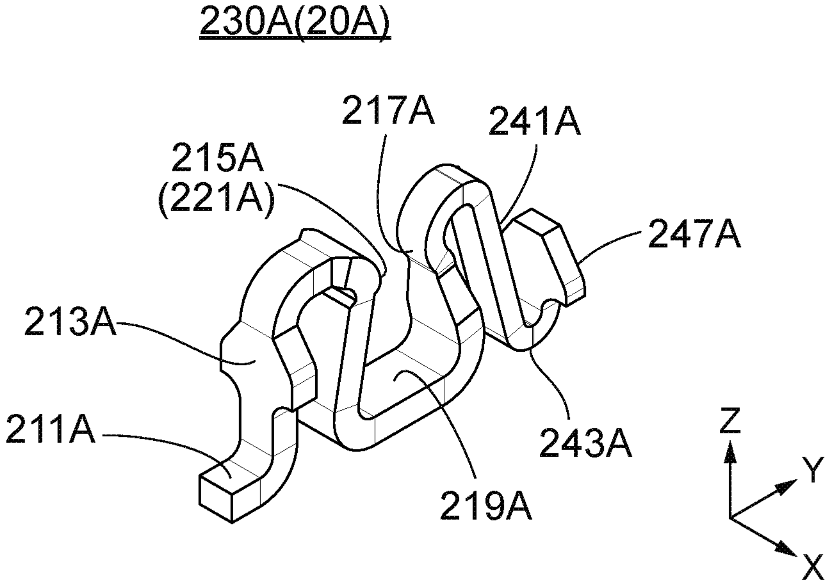
FIG. 36 is a perspective view showing one of second terminals of one of the terminal rows included in the connector of FIG. 33.

As shown in FIGS. 35 and 36, each of the terminals 20A has a first mount portion 211A, a held portion 213A, a first contact portion 215A, a second contact portion 217A, a supporting portion 219A, an extension portion 241A, a second mount portion 243A and an additive held portion 247A. However, the present invention is not limited thereto. The second terminal 230A may not be provided with the first mount portion 211A. In that case, the second terminal 230A may be provided with an end portion similar to the end portion 231 of the second terminal 230 of the first embodiment. The end portion like this is located apart from a substrate 80A when the connector 10A is mounted on the substrate 80A. If the second terminal 230A does not have the first mount portion 211A, wicking of the solder 82 from the substrate 80A to the first mount portion 211A is prevented.

Referring to FIGS. 33 and 34, the housing 30A is similar to the housing 30. The housing 30A is same as the housing 30 except that it is able to hold the terminals 20A. Particularly, an island portion 34 is provided with a plurality of inspection windows 341. In the present embodiment, the inspection windows 341 correspond to the second mount portions 243A of the second terminals 230A, respectively.

As understood from FIGS. 37 to 40, when the connector 10A is mounted on the substrate 80A, the first mount portion 211A of each of the first terminals 210A is fixed to a pad (see FIG. 11), which corresponds thereto, on the substrate 80A by using the solder 82. The second mount portion 243A of each of the second terminals 230A is fixed to a pad, which corresponds thereto, on the substrate 80A by using the solder 82.

Figure 37:
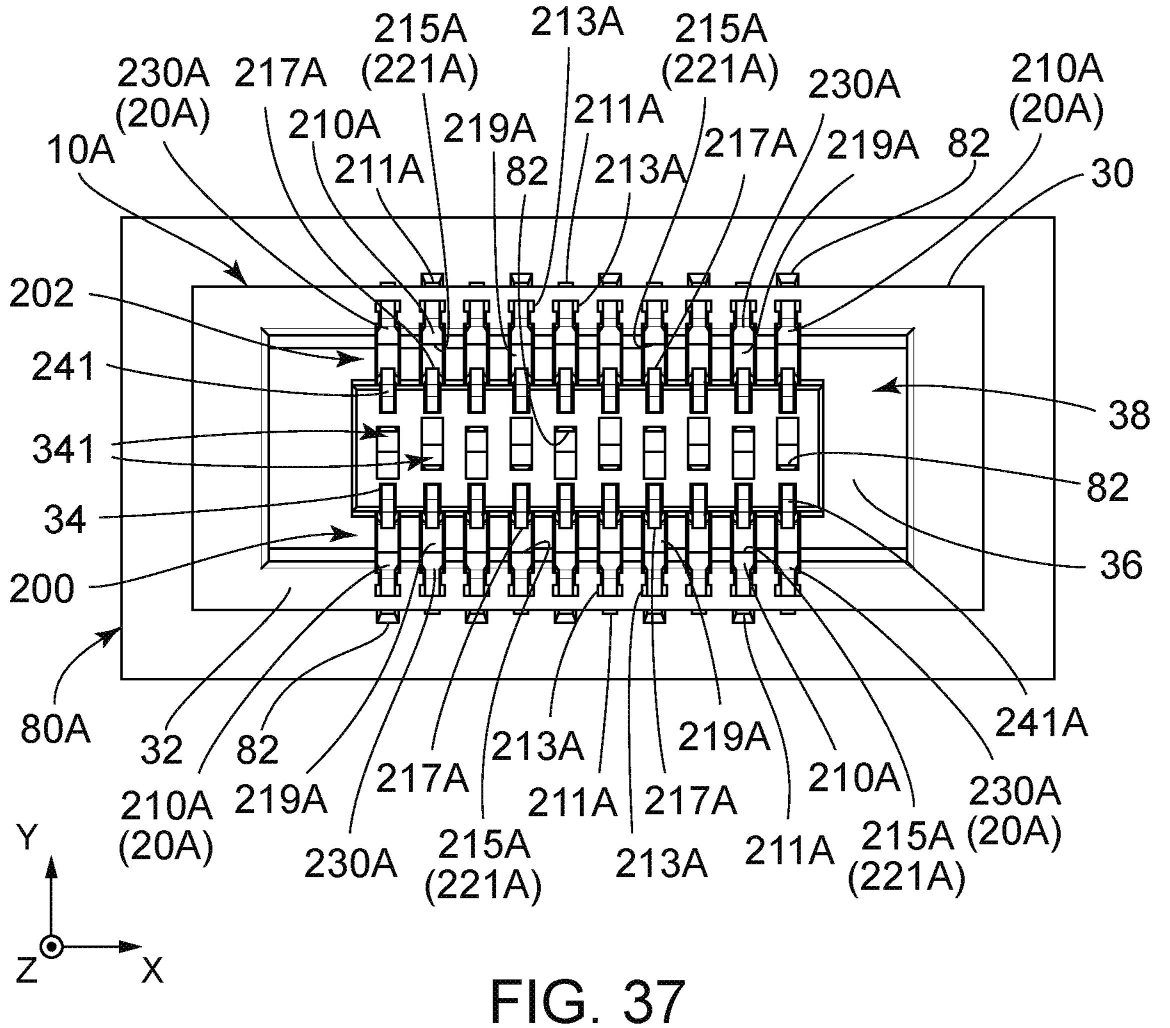
FIG. 37 is a plan view showing a device with the connector of FIG. 33. The connector is mounted on a substrate.
Figure 38:
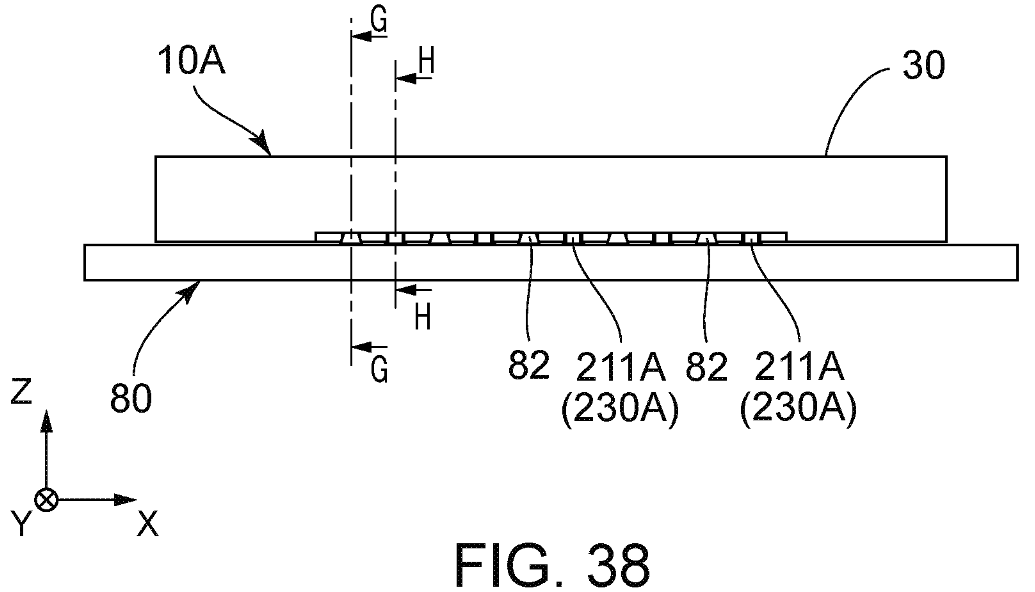
FIG. 38 is a side view showing the device of FIG. 37.
Figure 39:
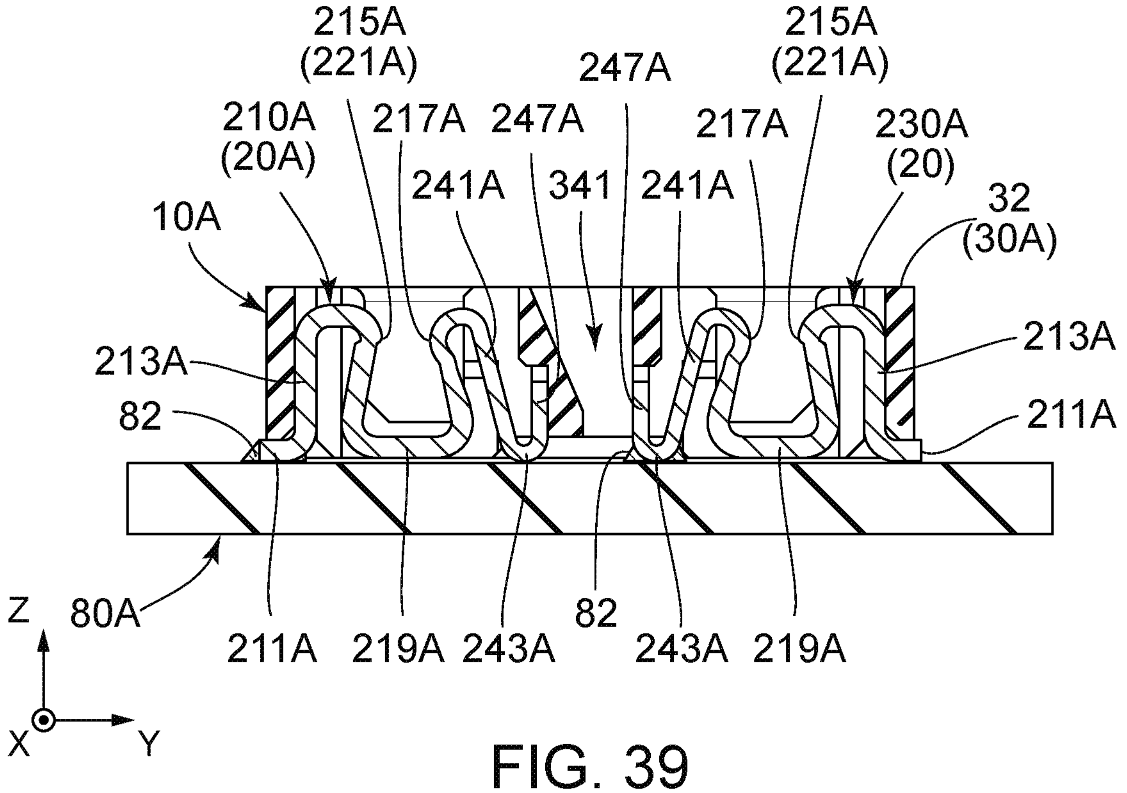
FIG. 39 is a cross-sectional view showing the device of FIG. 38, taken along G-G line.
Figure 40:
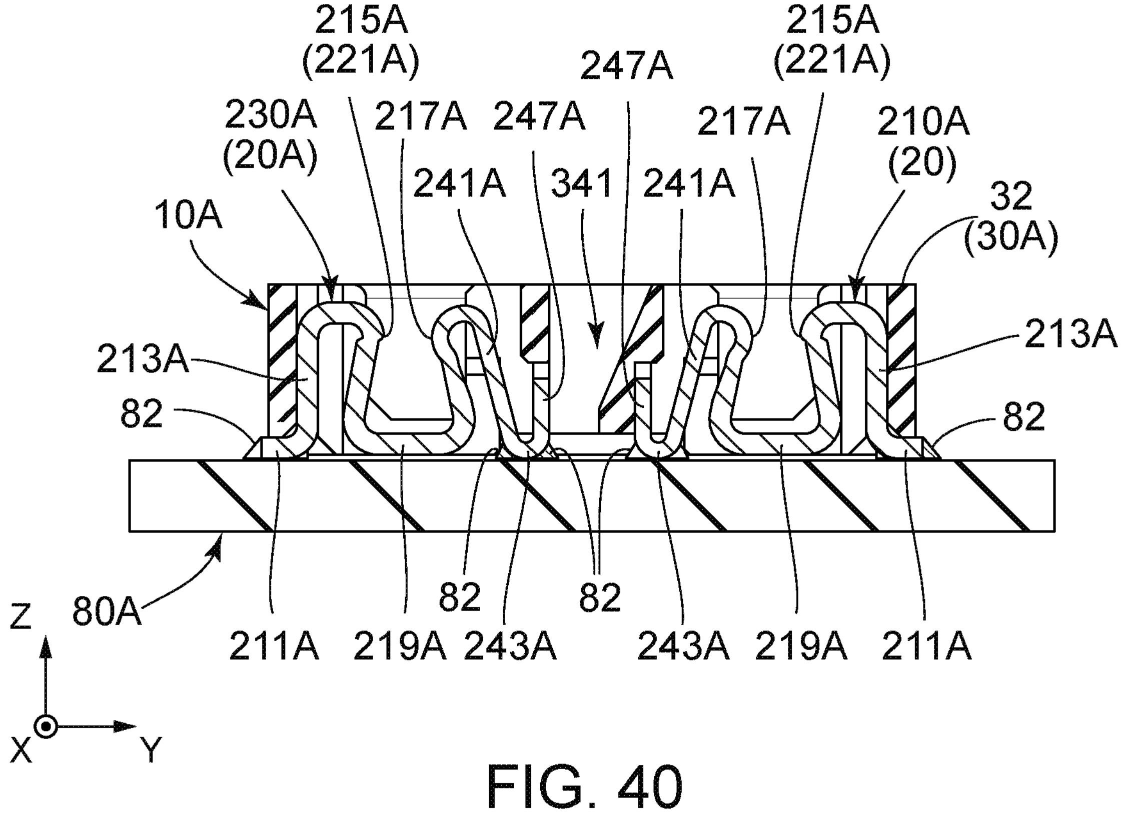
FIG. 40 is a cross-sectional view showing the device of FIG. 38, taken along H-H line.
Figure 41:
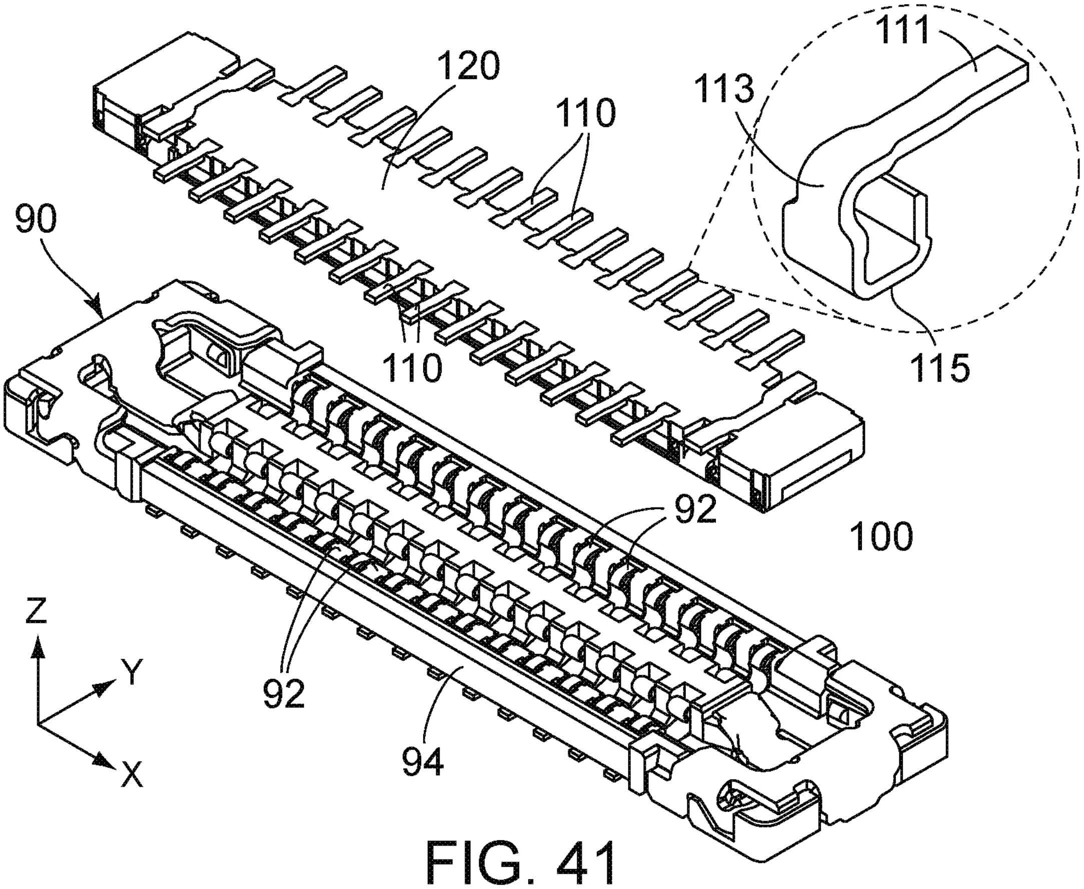
FIG. 41 PRIOR ART
FIG. 41 is a perspective view showing a connector and a mating connector which are disclosed in Patent Document 1.
Figure 42:
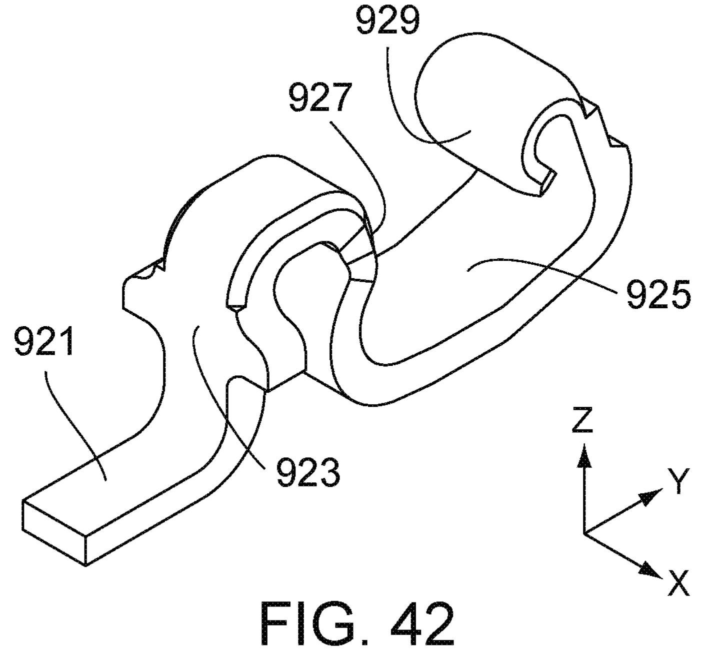
FIG. 42 PRIOR ART
FIG. 42 is a perspective view showing one of terminals included in the connector of FIG. 41.

As understood from FIG. 37, similarly to a case of the connector 10 of the first embodiment, when the connector 10A is mounted on the substrate 80A, fixing of the first mount portions 211A of the first terminals 210A and the second mount portions 243A of the second terminals 230A on the substrate 80A is visible from above in the up-down direction. In detail, in the present embodiment, each of the first mount portions 211A of the first terminals 210A is located outside the housing 30A in part in the width direction, so that the fixing of the first mount portion 211A on the substrate 80A is visible from above or diagonally above the substrate 80A. Moreover, in the present embodiment, the housing 30A is provided with inspection windows 341A corresponding to the second mount portions 243A of the second terminals 230A, respectively, so that fixing of the second mount portions 243A on the substrate 80A is visible through the inspection windows 341A corresponding to the second mount portions 243A, respectively, with keeping strength of the housing 30A.

Also in the connector 10A of the present embodiment, a distance between two of the terminals 20A adjacent to each other in the pitch direction can be reduced, so that small-sizing the connector 10A or increasing the number of the terminals 20 can be realized. In addition, the connector 10A of the present embodiment can suppress abrasion of the terminals 20A which is caused by mating with the mating connector 50, and high connection reliability can be obtained.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising a plurality of terminals and a housing which holds the terminals, wherein:

the terminals comprise first terminals and second terminals;

the first terminals and the second terminals are alternately arranged in a pitch direction;

each of the first terminals has a first mount portion, a held portion, a first contact portion, a second contact portion and a supporting portion;

each of the second terminals has a held portion, a first contact portion, a second contact portion, a supporting portion, an extension portion and a second mount portion;

in the first terminal, the held portion is located between the first mount portion and the first contact portion;

for each of the first terminal and the second terminal, the held portion is held by the housing;

in each of the first terminal and the second terminal, the supporting portion is resiliently deformable at least in part and extends from the first contact portion to support the second contact portion;

in each of the first terminal and the second terminal, the second contact portion faces the first contact portion in a width direction perpendicular to the pitch direction and is movable in the width direction by using resilient deformation of the supporting portion;

in the second terminal, the extension portion extends from the second contact portion;

in the second terminal, the second mount portion is formed in a part of the extension portion; and the second mount portion is located apart from the first mount portion in the width direction.

2. The connector as recited in claim 1, wherein, in each of the first terminal and the second terminal, the first contact portion is located between the held portion and the second contact portion in the width direction.

3. The connector as recited in claim 1, wherein:

the second terminal further has an additive held portion;

the additive held portion is held by the housing; and the extension portion extends from the second contact portion to the additive held portion.

4. The connector as recited in claim 3, wherein:

the extension portion has a size smaller than that of the supporting portion in the pitch direction; and the extension portion has a board thickness thinner than that of the supporting portion.

5. The connector as recited in claim 1, wherein, in a plane perpendicular to the pitch direction, positions of the held portion, the first contact portion, the supporting portion and the second contact portion of the first terminal are identical with positions of the held portion, the first contact portion, the supporting portion and the second contact portion of the second terminal, respectively.

6. The connector as recited in claim 5, wherein, when viewed along the pitch direction, the first terminal and the second terminal are identical with each other in shape.

7. The connector as recited in claim 1, wherein:

the connector is mateable with a mating connector having a mating lock portion in an up-down direction perpendicular to both the pitch direction and the width direction; and when the connector and the mating connector are in a mated state in which the connector and the mating connector are mated with each other, the first contact portion of the first terminal and the first contact portion of the second terminal serve as a lock portion which locks the mated state together with the mating lock portion.

8. The connector as recited in claim 1, wherein:

the connector comprises two terminal rows arranged in the width direction;

in each of the terminal rows, the first terminals and the second terminals are alternately arranged in the pitch direction;

a configuration of the first terminals and the second terminals of one of the terminal rows and a configuration of the first terminals and the second terminals of a remaining one of the terminal rows are arranged in rotation symmetry.

9. The connector as recited in claim 1, wherein the housing is provided with an inspection window which allows visible inspection of fixing of the second mount portion to a substrate therethrough under a condition where the connector is mounted on the substrate.

10. An assembly comprising the connector as recited in claim 1 and a mating connector which is mateable with the connector, wherein:

the mating connector comprises a plurality of mating terminals and a mating housing which holds the mating terminals;

the mating terminals comprise first mating terminals corresponding to the first terminals and second mating terminals corresponding to the second terminals;

the first mating terminals and the second mating terminals are alternately arranged in the pitch direction;

each of the first mating terminals has a first mating mount portion, a first mating contact portion and a second mating contact portion;

in the first mating terminal, the first mating contact portion is located between the first mating mount portion and the second mating contact portion;

each of the second mating terminals has a first mating contact portion, a second mating contact portion and a second mating mount portion;

in the second mating terminal, the second mating contact portion is located between the first mating contact portion and the second mating mount portion;

when the connector and the mating connector are mated with each other, the first mating contact portion and the second mating contact portion of the first mating terminal are brought into contact with the first contact portion and the second contact portion of the first terminal corresponding to the first mating terminal, respectively;

when the connector and the mating connector are mated with each other, the first mating contact portion and the second mating contact portion of the second mating terminal are brought into contact with the first contact portion and the second contact portion of the second terminal corresponding to the second mating terminal, respectively; and the first mating mount portion and the second mating mount portion are apart from each other in the width direction.

11. The assembly as recited in claim 10, wherein the mating housing is provided with mating inspection windows corresponding to the second mating mount portions, respectively.

12. The assembly as recited in claim 10, wherein when the connector and the mating connector are in a mated state in which the connector and the mating connector are mated with each other, the first mating contact portion of the first mating terminal and the first mating contact portion of the second mating terminal serve as a lock portion which locks the mated state together with a lock portion of the connector.

* * * * *